(12) United States Patent
Brady, Jr. et al.

(10) Patent No.: US 8,676,960 B2
(45) Date of Patent: *Mar. 18, 2014

(54) NETWORK EVENT CAPTURE AND RETENTION SYSTEM

(75) Inventors: Bernard E. Brady, Jr., East Walpole, MA (US); Mark Johnson, North Attleborough, MA (US); Matthew Stevens, Geneva, NY (US); Scott David Volk, North Easton, MA (US)

(73) Assignee: EMC Corporation, Hopkinton, MA (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/443,325

(22) Filed: May 30, 2006

(65) Prior Publication Data

US 2007/0011310 A1    Jan. 11, 2007

Related U.S. Application Data

(63) Continuation of application No. 10/727,193, filed on Dec. 3, 2003.

(51) Int. Cl.
*G06F 15/173* (2006.01)

(52) U.S. Cl.
USPC .......................................................... 709/224

(58) Field of Classification Search
USPC .................................. 709/223–225
See application file for complete search history.

(56) References Cited

U.S. PATENT DOCUMENTS

| 5,625,814 A | 4/1997 | Luciw |
|---|---|---|
| 5,627,886 A | 5/1997 | Bowman |
| 6,092,080 A | 7/2000 | Gustman |
| 6,148,338 A * | 11/2000 | Lachelt et al. ................. 709/224 |
| 6,219,708 B1 | 4/2001 | Martenson |
| 6,484,203 B1 | 11/2002 | Porras et al. |
| 6,496,858 B1 | 12/2002 | Frailong et al. |
| 6,530,024 B1 | 3/2003 | Proctor |
| 6,704,780 B1 | 3/2004 | Sethi |
| 6,754,214 B1 | 6/2004 | Mahalingaiah |
| 6,836,894 B1 | 12/2004 | Hellerstein et al. |
| 6,941,348 B2 | 9/2005 | Petry et al. |
| 6,985,944 B2 | 1/2006 | Aggarwal |

(Continued)

OTHER PUBLICATIONS

Yang et al. A Scalable, Web-Based Architecture for Hierarchical Network Management. Global Telecommunications Conference—Globecom'99. IEEE, 1999. pp. 1882-1888.*

(Continued)

*Primary Examiner* — John Macilwinen
(74) *Attorney, Agent, or Firm* — Kelley Drye & Warren LLP

(57) ABSTRACT

Methods and apparatus are provided to monitor and analyze activity occurring on a networked computer system. In some embodiments, a method is provided for capturing, in a data structure, at least a portion of a notification describing a network event provided by a node on a computer network, identifying a data element (e.g., an IP address of the node) within the notification, and updating an index and/or summary based on the data element. The data structure may be stored in a file system maintained on a site, and sites may exchange information related to the notification data stored on each. In some embodiments, a query which is issued to a site may be processed using data transferred from other sites, and/or may be split into one or more additional queries which may be transmitted for processing to other sites.

20 Claims, 13 Drawing Sheets

(56) References Cited

U.S. PATENT DOCUMENTS

| | | | |
|---|---|---|---|
| 7,017,185 | B1 | 3/2006 | Wiley et al. |
| 7,035,925 | B1 | 4/2006 | Nereddy et al. |
| 7,127,743 | B1 * | 10/2006 | Khanolkar et al. ............. 726/23 |
| 7,155,460 | B2 * | 12/2006 | McGovern et al. ............ 707/200 |
| 7,219,239 | B1 * | 5/2007 | Njemanze et al. ................ 726/3 |
| 7,254,636 | B1 | 8/2007 | O'Toole et al. |
| 7,590,747 | B2 | 9/2009 | Coates et al. |
| 2002/0046273 | A1 | 4/2002 | Lahr et al. |
| 2002/0078381 | A1 * | 6/2002 | Farley et al. .................. 713/201 |
| 2003/0120593 | A1 | 6/2003 | Bansal et al. |
| 2003/0158905 | A1 * | 8/2003 | Petry et al. ................... 709/206 |
| 2003/0204586 | A1 | 10/2003 | Schnetzler |
| 2004/0088405 | A1 * | 5/2004 | Aggarwal ..................... 709/224 |
| 2004/0205219 | A1 | 10/2004 | Li et al. |
| 2005/0015461 | A1 | 1/2005 | Richard et al. |
| 2005/0114321 | A1 | 5/2005 | DeStefano et al. |
| 2005/0114505 | A1 | 5/2005 | DeStefano et al. |
| 2005/0114508 | A1 | 5/2005 | DeStefano et al. |
| 2005/0114706 | A1 | 5/2005 | DeStefano et al. |
| 2005/0114707 | A1 | 5/2005 | DeStefano et al. |
| 2005/0114708 | A1 | 5/2005 | DeStefano et al. |
| 2005/0188076 | A1 | 8/2005 | Rayburn et al. |
| 2006/0117091 | A1 * | 6/2006 | Justin ............................ 709/217 |
| 2007/0112810 | A1 | 5/2007 | Jonsson |
| 2007/0143842 | A1 | 6/2007 | Turner et al. |

OTHER PUBLICATIONS

Wutka, Mark; Special Edition Using Java 2 Enterprise Edition; May 8, 2001; pp. 1-4.

Microsoft Corporation; Microsoft Computer Dictionary, Fifth Edition; Microsoft Press; May 1, 2002: pp. 1-6.

T.E. Anderson et al., "Serverless Network File Systems," Computer Science Division, University of California at Berkeley, Association for Computing Machinery, Inc., pp. 1-21; 1995.

\* cited by examiner

106

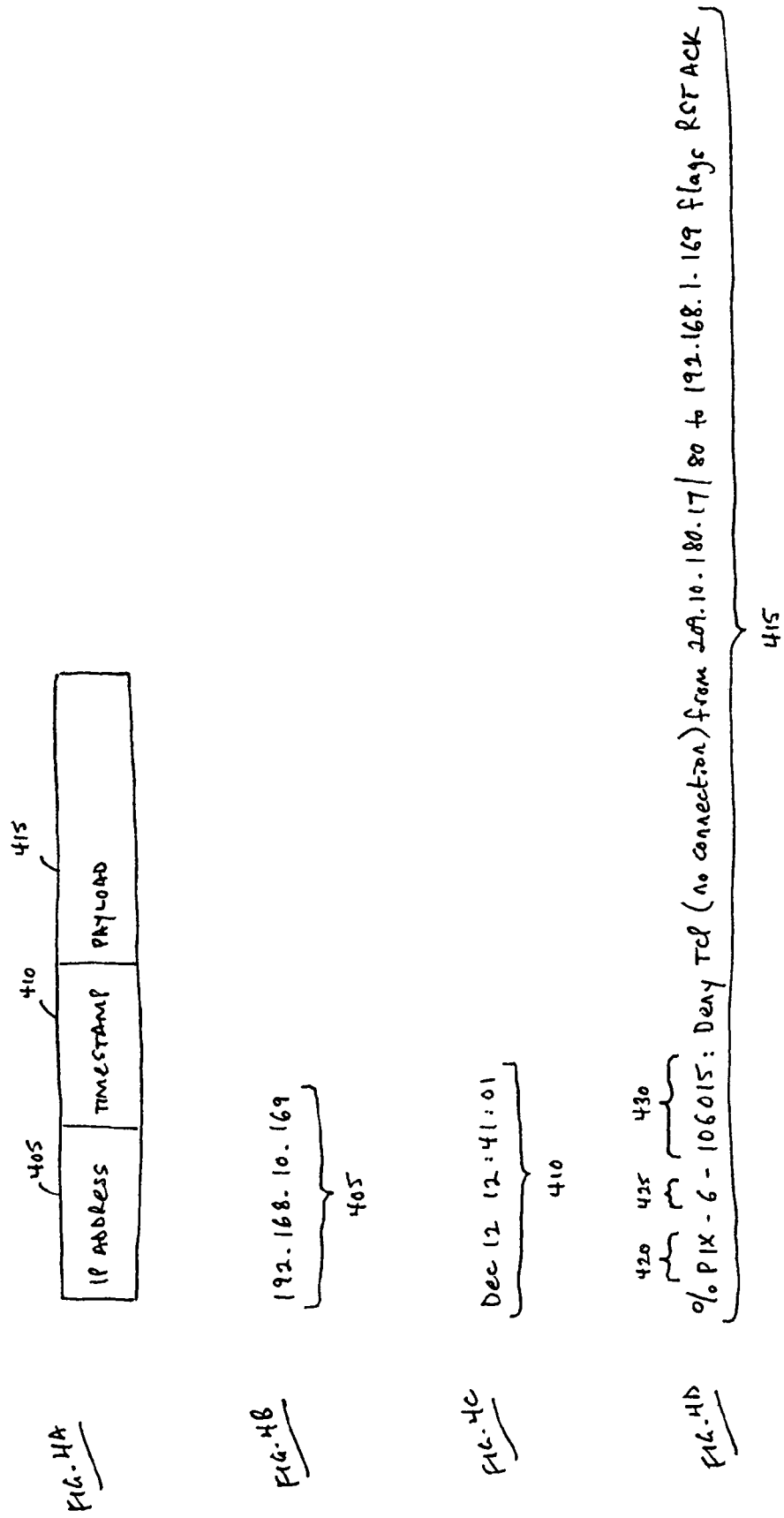

NETWORK EVENT CAPTURE AND RETENTION SYSTEM

RELATED APPLICATION

This application claims priority under 35 U.S.C. §120 to U.S. patent application Ser. No. 10/727,193, filed Dec. 3, 2003, titled "Network Event Capture and Retention System," which is incorporated herein by reference in its entirety.

FIELD OF THE INVENTION

This invention relates to networked computer systems, and more particularly to methods and apparatus for monitoring network activity.

BACKGROUND

Many networked computer systems include one or more mechanisms for reporting on events occurring thereon. For example, many network communications devices (e.g., routers, bridges and switches) produce and transmit a notification (or "message"), for diagnostic and debugging purposes, upon processing a network-based event. The notification may, for example, describe the event and exactly how it was processed by the device. The notification may be transmitted on a network protocol, such that any device "listening for" the notification on that protocol is informed that the event was processed by the device. Examples of common network event notifications include "SYSLOG" messages, Simple Network Management Protocol (SNMP) messages, NetFlow messages, raw Transmission Control Protocol (TCP) packets, and other notification types.

A network event notification may contain the IP address of the device which produced it, and a hexadecimal code which indicates the result of processing the event. The code may indicate, for example, that a requested connection was established, or that a processing error occurred. Because every event processed by every device on a network typically yields at least one notification, the notifications may become voluminous if collected over time.

A number of systems exist for monitoring and analyzing network activity, including those which capture notifications, as well as other indications of network activity. These systems are typically designed to detect network events, load information relating to the events to a database, and provide an interface with which a user may analyze the information. However, the volume of network event notifications often significantly hinders these systems. Specifically, because loading any form of data to a conventional database (e.g., a relational database) can inflate the data significantly, the hardware and software components required to store data indicating network activity (particularly for a large-scale network) can be prohibitively costly. Moreover, as a database grows in size, the time and processing capacity required to access information stored therein typically progresses geometrically, not linearly. As a result, many network monitoring systems attempt to minimize the amount of data loaded to a database by summarizing, normalizing, or otherwise abridging it. This may become problematic because while not all network activity data has equal significance, different portions may be meaningful at different times, in unpredictable ways. Thus, abridging the data may remove a portion which has great significance to diagnosing a particular network issue.

SUMMARY OF THE INVENTION

These and other shortcomings are addressed by aspects of embodiments of the present invention. Some embodiments provide a method, in a computer system comprising a plurality of nodes interconnected for communication via a network, including acts of: (A) capturing, in a data structure, a notification provided by a node on the network, the notification comprising at least a portion of a transmission by the node, the transmission describing a network event; (B) identifying a data element within the notification; (C) updating an index, based on the data element, with an indication of a location within the data structure where the data element is recorded. In some embodiments, the act (A) further comprises storing the data structure in a non-volatile storage, such as in a hierarchical file system.

Other embodiments provide at least one computer-readable medium encoded with instructions which, when executed by a computer, perform a method in a computer system comprising a plurality of nodes interconnected for communication via a network, a method including acts of: (A) capturing, in a data structure, a notification provided by a node on the network, the notification comprising at least a portion of a transmission by the node, the transmission describing a network event; (B) identifying a data element within the notification; (C) updating an index, based on the data element, with an indication of a location within the data structure where the data element is recorded. In some embodiments, the instructions further define storing the data structure in a non-volatile storage, such as in a hierarchical file system.

Other embodiments provide a system for monitoring activity occurring in a computer system comprising a plurality of nodes interconnected for communication via a network, the system comprising: a capture controller, said capture controller capturing, in a data structure, a notification provided by a node on the network, the notification comprising at least a portion of a transmission by the node, the transmission describing a network event; an identification controller, said identification controller identifying a data element within the notification; and an update controller, said update controller updating an index, based on the data element, with an indication of a location within the data structure where the data element is recorded. In some embodiments, the capture controller may further store the data structure in a non-volatile storage, such as in a hierarchical file system.

Other embodiments provide a method for monitoring activity on a networked computer system, the networked computer system comprising a plurality of nodes, each of the plurality of nodes configured to transmit a notification for each event processed by the node, the networked computer system further comprising a plurality of sites, each of the plurality of sites being configured to capture the notifications transmitted by at least one node, the method comprising: (A) each of the plurality of sites creating an indication of the notifications captured by the site; and (B) each of the plurality of sites transferring the indication to at least one other of the plurality of sites. In some embodiments, the plurality of sites are organized into a hierarchy, wherein each site in the hierarchy is assigned at least one of a master site and a subordinate site.

Other embodiments provide at least one computer-readable medium encoded with instructions which, when executed by a computer, perform a method for monitoring activity on a networked computer system, the networked computer system comprising a plurality of nodes, each of the plurality of nodes configured to transmit a notification for each event processed by the node, the networked computer system further comprising a plurality of sites, each of the plurality of sites being configured to capture the notifications transmitted by at least one node, the method comprising: (A)

each of the plurality of sites creating an indication of the notifications captured by the site; and (B) each of the plurality of sites transferring the indication to at least one other of the plurality of sites. In some embodiments, the at least one computer-readable medium comprises instructions for organizing the plurality of sites into a hierarchy, wherein each site in the hierarchy is assigned at least one of a master site and a subordinate site.

Other embodiments provide a system for monitoring activity on a networked computer system, the networked computer system comprising a plurality of nodes, each of the plurality of nodes configured to transmit a notification for each event processed by the node, the networked computer system further comprising a plurality of sites, each of the plurality of sites being configured to capture the notifications transmitted by at least one node, comprising: a creation controller on each of the plurality of sites, said creation controller creating an indication of the notifications captured by the site; and a transfer controller on each of the plurality of sites, said transfer controller transferring the indication to at least one other of the plurality of sites. In some embodiments, the system comprises a plurality of sites organized into a hierarchy, wherein each site in the hierarchy is assigned at least one of a master site and a subordinate site.

BRIEF DESCRIPTION OF THE DRAWINGS

For purposes of clarity, not every component may be labeled in every drawing. In the drawings, in which each like components are represented by like numerals:

FIG. 4 is a representation of the format of an exemplary data structure created to represent a network event notification;

DETAILED DESCRIPTION

I. Overview

Figure 1:
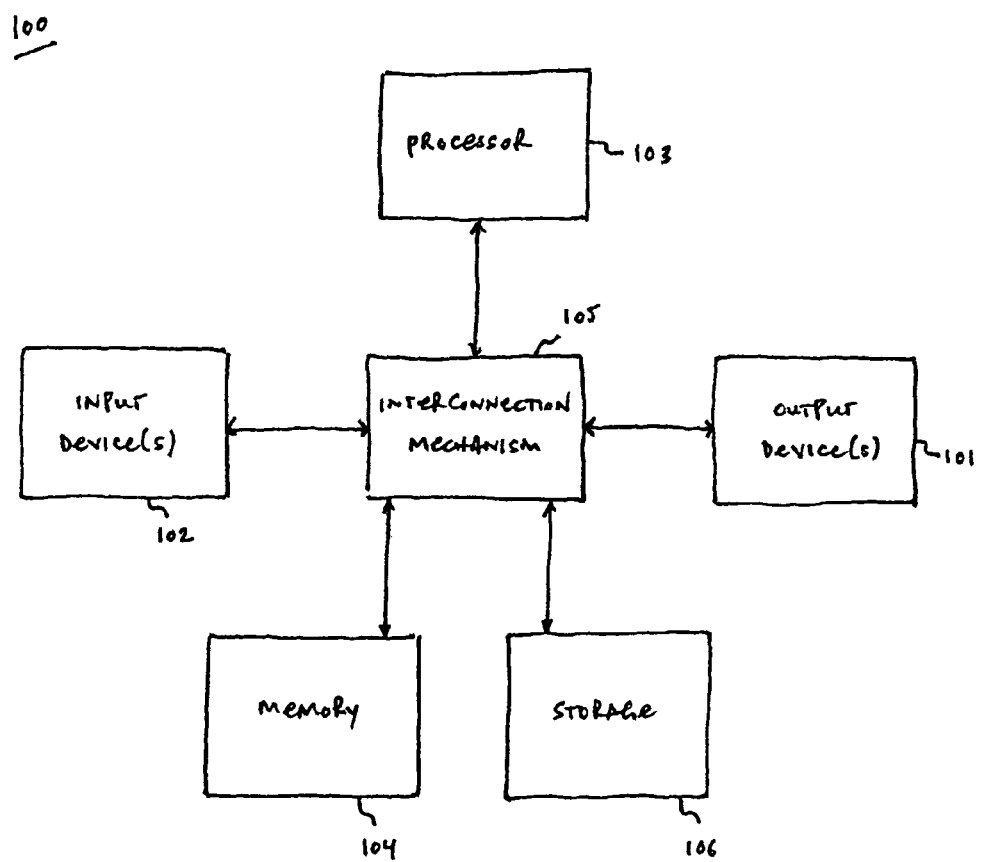
FIG. 1 is a block diagram of an exemplary computer system, with which embodiments of the invention may be implemented.

The present invention provides a system and method for capturing, storing and analyzing activity observed on a computer network, which is not hindered by the storage overhead and/or data inaccessibility issues that may be associated with other network monitoring systems.

In some embodiments, rather than loading network activity data to a conventional database (e.g., a relational database), which may impose substantial storage overhead and hinder access to data (e.g., when a large volume of data is stored therein), an observation record, created from a network event notification, is loaded to a specific individual data structure (e.g., a "flat" file) based on one or more characteristics of the notification. Any number of characteristics may define which of the records are loaded to a particular data structure. For example, a record may be loaded to a data structure based on the IP address of a device (e.g., a router, switch, or other device) that reports the event, and/or a time period during which the event was reported. For example, an exemplary data structure may be loaded with all activity reported by a particular switch at IP address 192.168.10.3 for a one-minute period starting at 10:03 AM. Other data structures may be created and loaded with activity data reported by the same device at successive one-minute increments, such that an ever-expanding series of data structures may be created for that device over time. As a result, in this example, a large number of data structures may be created, but the relatively small number of observation records in each may make the data more accessible than it would have been in a conventional database.

In some embodiments, data accessibility may be further improved by providing one or more indices which supply the location of particular observation records exhibiting certain characteristics. For example, an index may indicate the data structure that contains an observation record exhibiting a characteristic, and/or the record's location within the data structure. An index may be created based on any of numerous observation record characteristics. For example, an index may provide an indication of the location of a particular type of notification, an originating IP address, a destination IP address, any other suitable data value, or a combination thereof.

By storing and/or indexing data in this manner (i.e., in relatively small data structures), the system may provide for the storage of network event notification data as it is processed in its entirety. That is, rather than storing summarized and/or normalized network activity data (which many conventional systems may do in order to mitigate the storage overhead and/or inaccessibility issues that arise with conventional databases), an observation record may store a notification in the complete form in which it was originally reported. As a result, data analysis may employ the actual notification, rather than a summary or normalized version of the notification, yielding improved data forensics.

In addition to storing notifications in their entirety, the system may also provide one or more summaries so that the complete notifications and/or observation records need not be accessed in order for certain data analyses to be performed. A summary may be created with respect to any number of data characteristics within any number of observation records. In one example, a summary may provide the number of occurrences of each destination IP address in a data structure containing a week's worth of observation records. In another example, a summary may provide the number of bytes transferred by each originating IP address in a particular day. Any number of summaries, incorporating any amount of data, may be created.

In addition, summaries may be combined to create aggregate (e.g., cumulative) summaries. In one example, a series of summaries produced for data structures created at one-minute intervals may be aggregated to produce hourly, daily, monthly or any other cumulative temporal summary. In another example, summaries created from 9 AM-12 PM each day may be aggregated to produce a summary of morning activity over any period, such as one month.

In some embodiments, the collection and storage of observed network activity is performed by one or more distributed system "sites," each of which consists of one or more hardware and/or software components, and is in networked communication with other sites. The distribution of sites to monitor network activity may be accomplished in any of numerous ways. For example, sites may be distributed such that each site collects observations for a specific portion of a network, such as portions which are deployed in different geographic areas. In another example, each site may monitor different network protocols. The invention is not limited to a particular implementation.

In some embodiments, sites deployed on different network portions exchange information on observed activity, such that analysis of network activity initiated from any site may incorporate activity observed by all sites. The information which is exchanged may relate to any of numerous network activities and/or observation characteristics. Thus, a user who wishes to determine, for example, which users have accessed a particular IP address (e.g., a web site) may issue a query, via an interface, to a particular site, and that site may store data, provided to the site during previous data exchanges, indicating the other sites that have observed activity involving that IP address. Depending on the information requested in the query, the site may simply respond to the query with information that was previously exchanged, or may issue one or more additional queries to the other sites that observed the activity. The site may receive one or more responses from the sites, and tabulate results for the user, so that the user need not know which sites observed the activity. This form of data analysis is discussed in detail below.

Various aspects of the invention may be implemented using one or more computer systems, such as the exemplary computer system 100 shown in FIG. 1. Computer system 100 includes input device(s) 102, output device(s) 101, processor(s) 103, memory system(s) 104 and storage 106, all of which are coupled, directly or indirectly, via interconnection mechanism 105, which may comprise one or more buses, switches, and/or networks. One or more input devices 102 receive input from a user or machine (e.g., a human operator, or programmed process), and one or more output devices 101 display or transmit information to a user or machine (e.g., a liquid crystal display). One or more processors 103 typically execute a computer program called an operating system (e.g., Sun Solaris, Microsoft Windows®, or other suitable operating system) which controls the execution of other computer programs, and provides scheduling, input/output and other device control, accounting, compilation, storage assignment, data management, memory management, communication and data flow control. Collectively, the processor and operating system define the computer platform for which application programs in other computer programming languages are written.

The processor(s) 103 may also execute one or more computer programs to implement various functions. These computer programs may be written in any type of computer programming language, including a procedural programming language, object-oriented programming language, macro language, or combination thereof. These computer programs may be stored in storage system 106. Storage system 106 may hold information on a volatile or nonvolatile medium, and may be fixed or removable. Storage system 106 is shown in greater detail in FIG. 2.

Figure 2:
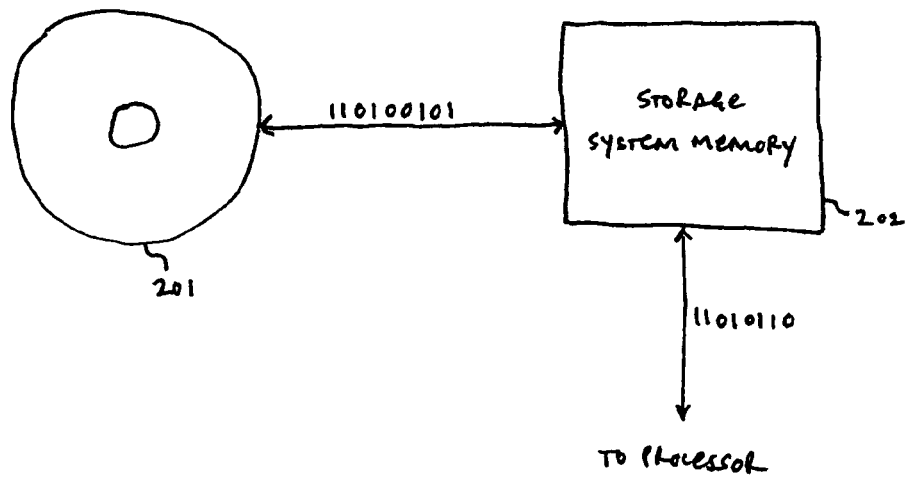
FIG. 2 is a block diagram of an exemplary computer memory, on which programmed instructions comprising illustrative embodiments of the invention may be stored.

Storage system 106 typically includes a computer-readable and -writeable nonvolatile recording medium 201, on which signals are stored that define a computer program or information to be used by the program. The medium may, for example, be a disk or flash memory or combination thereof. Typically, in operation, the processor 103 causes data to be read from the nonvolatile recording medium 201 into a volatile memory 202 (e.g., a random access memory, or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is also not limited to a particular memory system 104 or storage system 106.

Aspects of the invention may be implemented in computer software, hardware, firmware, or combinations thereof. For example, aspects of the invention may be implemented in a server appliance. That is, a server appliance having one or more software and/or hardware components may perform any of the aspects of the present invention described herein.

In addition, various aspects of the invention, either individually or in combination, may be implemented as a computer program product, including a computer-readable medium encoded with instructions for access and execution by a computer processor. When executed by a computer, the instructions may instruct the computer to implement various aspects of the invention.

II. Data Capture and Storage

Figure 3A:
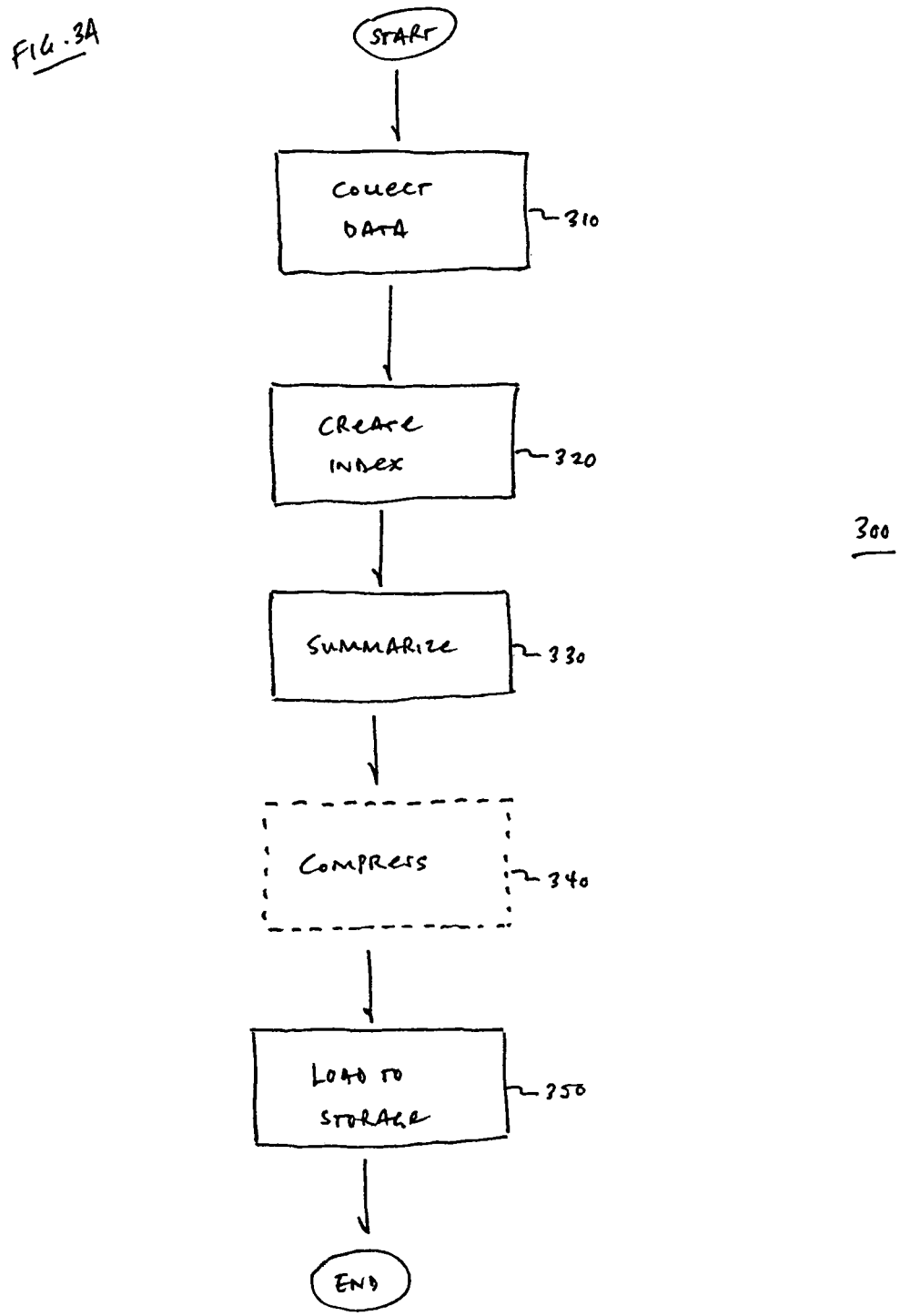
FIG. 3A is a flowchart depicting an exemplary process for collecting, managing and storing network activity data.

In some embodiments, computer hardware and/or software are implemented to capture and store network activity data according to a process 300, depicted in FIG. 3A. In some embodiments, network activity data may be captured and stored by the system 350 depicted in FIG. 3B, although any suitable means may be employed.

Exemplary system 350 includes site 360, which may comprise one or more computer systems, such as the system 100 described with reference to FIG. 1. Site 360 may communicate via network 370 with each of nodes 375, 380 and 385. More specifically, nodes 375, 380 and 385 may transmit network event notifications via links 373, 378 and 383, respectively, which are communicated via network 370 and link 369 to site 360.

In some embodiments, site 360 includes means for capturing and storing network activity data. In some embodiments, these means may comprise one or more of the components depicted in FIG. 3B, such as update controller 361, identification controller 363, capture controller 365 and/or storage facility 367. However, the invention is not limited to the depicted components, as any suitable means may be employed. Further, each of these means may be implemented in software, dedicated hardware, general-purpose hardware programmed using microcode or software, or a combination thereof, all of which is within the skill of computer and communications engineers to implement. When implemented in software, any of the means may execute on any suitable processor or collection of processors, whether provided in a single computer or distributed among multiple computers. The function of each of these means is discussed below with reference to the process 300 of FIG. 3A, although these means may be deployed to perform any suitable process(es).

Upon the start of process 300, network activity data is collected in act 310. This act may be performed by any means for capturing data, such as capture controller 365. In some embodiments, this data comprises one or more network event notifications (e.g., comprising SYSLOG, SNMP, or NetFlow messages, or a combination thereof) transmitted by one or more of nodes 375, 380, 385. Each of these nodes may comprise a router, switch, bridge, other network connectivity device, or combination thereof. The notification may be received at the site 360 by the capture controller 365, which may create an observation record based on the notification.

The format of an exemplary observation record created by the capture controller 365 is depicted in FIG. 4A. Record 401 contains three primary portions, including IP address portion 405, time stamp portion 410 and payload portion 415. These portions are depicted in greater detail in FIGS. 4B-4D. Specifically, FIG. 4B shows IP address portion 405, which provides the IP address ("192.168.10.169") associated with the device reporting a network event. FIG. 4C shows time stamp portion 410, which provides the date and time ("Dec 12 12:41:01") at which the device processed the event. FIG. 4D depicts payload portion, which provides a description of the device's handling of the event. In the example shown, the payload portion 415 indicates that the device refused a TCP connection ("Deny TCP (no connection)") from a device having IP address 209.10.180.17. The data which is loaded to any or all of the record portions 405, 410 and 415 may be provided within the network event notification (e.g., SNMP message), or written to the observation record by the site. For example, a site may provide the information which is written to time stamp portion 410, but extract the information written to IP address portion 405 and payload portion 415 from a network event notification.

The information written to payload portion 415 may include any of numerous types of data. In the example shown, payload portion 415 includes at least three indicators provided within a network event notification that further identify the device and event. Specifically, indicator 420 provides a description of the device which processed the event (in the example shown, a Cisco PIX firewall). Indicator 425 provides a message "level," which is a numeric rating assigned to each message type identified by indicator 430. A message type may be defined by a vendor who produces the device, and provides a classification for actions taken by the device to handle an event. Each message type may be assigned a message level, which may indicate the severity of the event, or of the action taken by the device.

It should be appreciated that the IP address shown in portion 405 is typically different than the IP address of the device from which a network request was issued (i.e., the "originating IP address") and the IP address of the device which is the intended recipient of the request (i.e., the "destination IP address"). That is, the IP address contained in portion 405 of an observation record corresponds to a device which processed the request along its path from the originating IP address to the destination IP address.

Referring again to FIG. 3A, the collection of data in act 310 may be complicated in two respects. First, as discussed above, a substantial amount of activity may be observed, meaning that a substantial amount of data may be collected. For example, it is not uncommon for each device on a network to issue, each hour, thousands of network event notifications, each of which may be represented by an observation record like that which is depicted in FIG. 4. Dozens of devices may be deployed on a large-scale network. To cope with this, many conventional systems normalize or otherwise summarize this data before loading it to a database, and do not preserve the full, raw information provided in a notification. Second, for security reasons, it may not be appropriate to commingle information produced by different devices. For example, a system administrator may wish to grant access to some information to only specific authorized users.

Figure 3B:
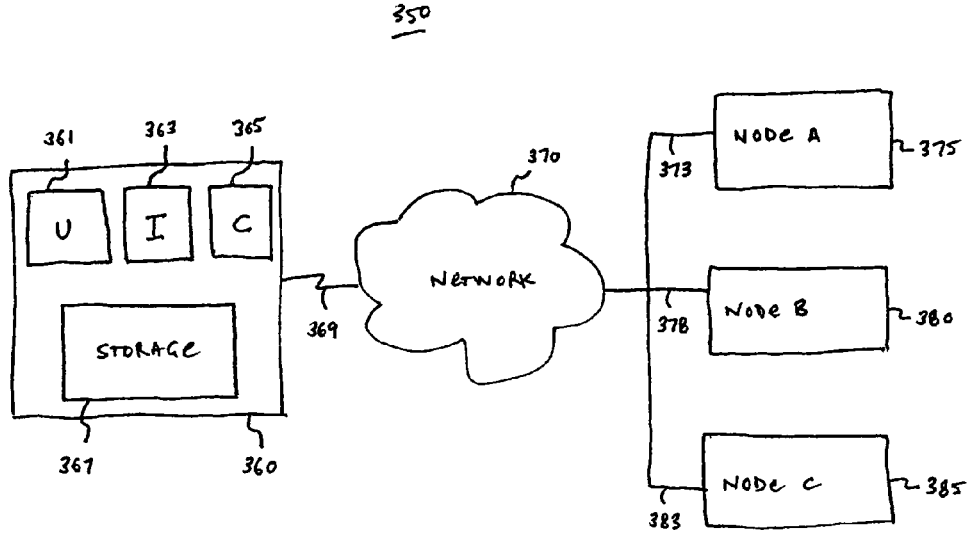
FIG. 3B is a block diagram depicting an exemplary system for collecting, managing and storing network activity data.

Accordingly, in at least some embodiments, act 310 is provided to load network activity data to a particular data structure based on one or more characteristics of the data. The characteristic(s) may be identified using any suitable means, such as identification controller 363 (FIG. 3B). For example, an observation record may be loaded to a specific data structure based on the time at which the record was created, and/or the device which transmitted the corresponding notification. As a result, act 310 may include the creation of multiple data structures (e.g., flat files), each of which may reside in storage facility 367 (FIG. 3B), which may contain observation records representing particular events reported by a particular device during a particular time period. Thus, in some embodiments the creation and population of each data structure may be a quick, one-time occurrence, but the population of data structures overall may be viewed as a cyclical occurrence. That is, a first data structure may be initialized, populated until a predefined collection period expires, and completed, whereupon a new data structure is initialized, populated until the next period expires, and so forth.

It should be appreciated that, although there may be diagnostic benefits to loading network event notifications in their entirety to storage, the invention is obviously not limited in this regard. Any suitable portion of a notification, up to and including an unabridged version, may be loaded to storage.

Data may be collected for any number of periods, and each period may be of any (usually pre-set) duration. For example, data may be collected for a first device at one-minute intervals, and for a second device at ten-minute intervals. Further, a set of data structures may store data for a device collected at irregular intervals, such that one data structure stores one minute's worth of data, while another stores ten minutes worth of data. The invention is not limited to any particular implementation.

Upon the completion of a data structure in act 310, the process proceeds to act 320, wherein one or more indices may be generated for the data structure. The index or indices may be created using any suitable means, such as update controller 361 (FIG. 3B). An index may be generated for any of numerous characteristics of the data structure. For example, an index may indicate the data structure's physical location (e.g., on a certain disk), the data elements stored therein, other characteristics, or a combination thereof. For example, an index may indicate the data structure(s) and/or record(s) containing specific types of observation records, originating IP address, or other characteristic(s).

An index may provide a lookup mechanism by means of which specific data may be accessed quickly. In some embodiments, the system may be configured to access an index automatically upon receiving a request to access certain data. For example, a site may provide an interface enabling a user to issue queries. Where appropriate, queries may be processed by the site by accessing the indices to determine the location of information requested by the query. Thus, a user need not know the specifics of how the data is stored (e.g., in which data structure(s) it may be stored) in order to perform effective analysis on the data.

Figure 5:
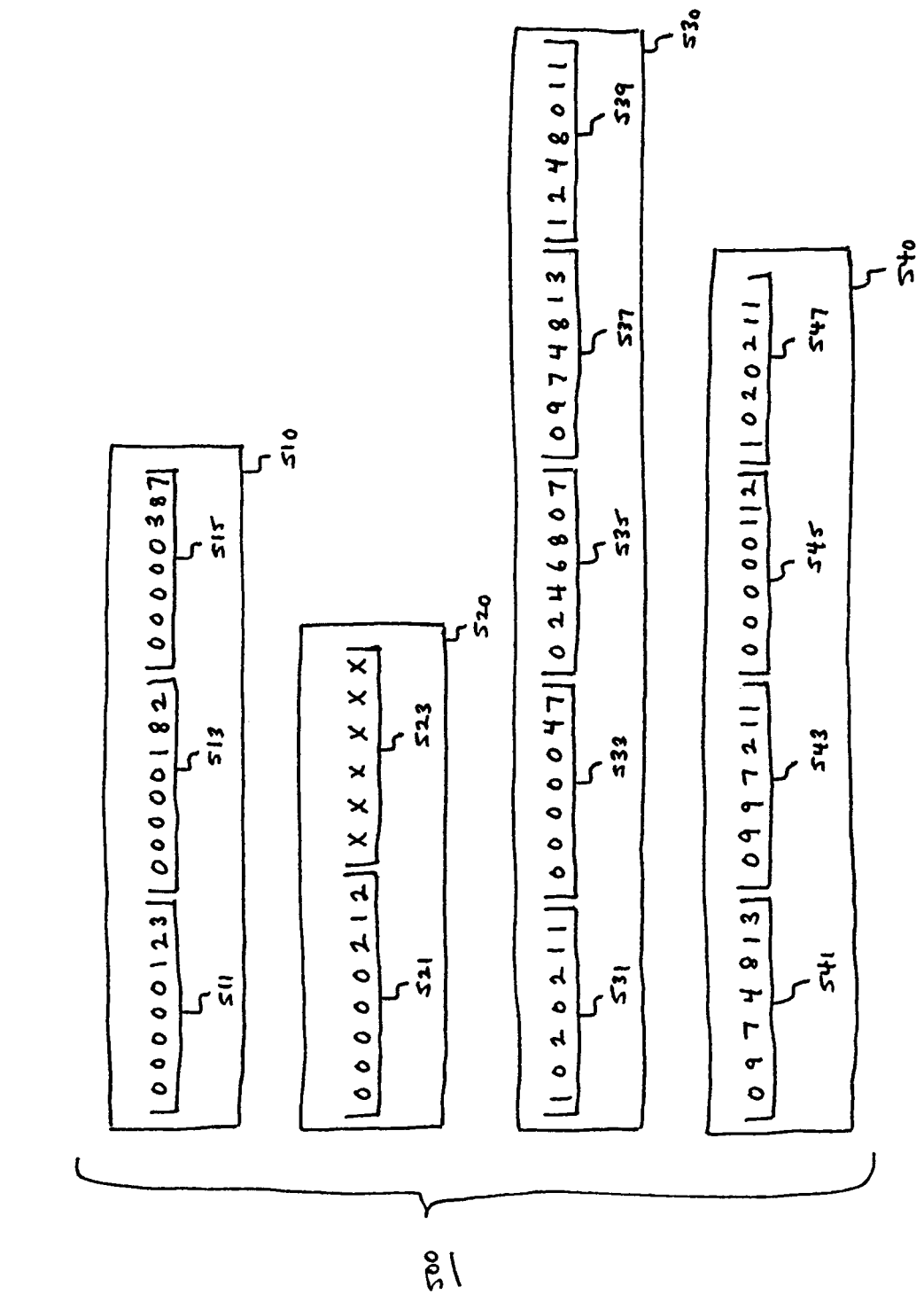
FIG. 5 is a representation of the format of an exemplary index file according to some embodiments of the invention.

The format of an exemplary index file 500 is shown in FIG. 5. The index file 500 comprises four record types: header record 510, information record 520, type index record 530 and message index record 540. One or more of each record type is stored in sequence within the index file. For example, an index file may contain one header record 510, one information record 520, sixteen type index records 530 and thirty message index records 540. The number of each type of record may depend on the information stored in the data structure that the index represents, as discussed below.

Header record 510 typically contains three portions, including information offset 511, type index offset 513, and message index offset 515, each of which indicates where other record types begin in the file. For example, information offset 511 indicates the location in the file at which information record 520 begins. In the example shown, information offset 511 indicates that information record 520 begins at offset 123. Similarly, type index offset 513 indicates that type index record 530 begins at offset 182, and message index offset 515 indicates that message index record 540 begins at offset 387. An offset may be expressed as any quantifiable measure of data, including bytes, bits, or other measure.

Information record 520 typically contains two portions, including type quantity indicator 521 and information string 523. Type quantity indicator 521 provides the number of record types (discussed below) which are found in the index record. Information string 523 provides a configurable descriptor for the index.

Type index record 530 may provide a portion of the index file in which records of various types are stored. Type index record 530 contains five portions, including record type indicator 531, message quantity indicator 533, transfer quantity indicator 535, first message index 537 and last message index 539. The record type indicator 531 provides a classification for network events, which may be defined by the vendor of a device that reported the event, or another entity. In the example shown, record type indicator 531 defines that this type index record 530 provides information for record type 1020211. Message quantity indicator 533 provides a number of observation records for this record type. Transfer quantity indicator 535 provides the amount of data transferred during events corresponding to this record type. First message index 537 provides an offset (e.g., a byte offset, or record offset) at which the first record of this type can be found in the data structure that the index represents. Last message index 539 provides an offset at which the last record of this type can be found in the data structure that the index represents. First message index 537 and last message index 539 may provide a useful means of extracting records of a particular type from a data structure, by identifying a section of the data structure in which records of this type are stored.

Message index record 540 provides the location of individual records of a particular type in the data structure. Record type indicator 547 identifies this record type. Offset indicator 541 identifies a location within the data structure at which an individual record of this type resides, while next message indicator 543 identifies the location of the following record of this type in the data structure. As such, the next message indicator provides a mechanism for directly accessing the next message of the type provided in the record type indicator 547, without searching for the next record 540 of that type. Message length indicator 545 identifies the number of bytes occupied by the record identified by offset indicator 541.

In some embodiments, a plurality of index files may be combined to facilitate access to activity stored in a plurality of data structures. For example, a first index that provides the location of a specific element in one data structure may be combined with one or more indices that provide the location of that element in other structures. In this manner, indices of data structures created at one-minute intervals can be combined to produce an aggregate index of data collected over an hour, day, week, or any other interval.

Aggregate indices may be produced in any of numerous ways. For example, a software-based routine may execute on a periodic basis (e.g., hourly) to aggregate the indices that were created since its last execution. In another example, an aggregate index may be updated as each individual index is generated in act 320.

Upon the completion of act 320, the process proceeds to act 330, wherein a summary may be created, using any suitable means, based on information stored in the data structure. Because a data structure may contain all of the observations reported by a device during a particular period, a summary may provide a useful indication of a subset that is of particular interest. For example, while a typical device may generate over 250 types of network event notifications, only about 5 of those notification types are of interest to typical users. Accordingly, in some embodiments, one or more summaries may be created which provide an indication of data of interest stored in a data structure.

A summary may provide an indication of any data stored in a data structure. For example, a summary may provide the number of times each originating IP address occurred in observation records stored in a data structure. A summary may alternatively provide an amount of data transferred during TCP sessions represented in a data structure (e.g., based on the number of bytes shown in the payloads of each "TCP Disconnect" notification therein). A summary may alternatively provide the total duration of all TCP sessions represented in a data structure (e.g., by subtracting the clock indication shown in each "TCP Connect" notification from the indication shown in its corresponding "TCP Disconnect" notification). In short, a summary may be generated for any of numerous data elements stored in a data structure, including combinations thereof.

Like an index, a summary may incorporate multiple data structures. For example, a summary may incorporate data structures collected over a day, month, year or other interval. A summary spanning multiple files may be produced by combining previously generated summaries of individual files, updating the aggregate summary each time an individual data structure summary is updated, or by using any other suitable technique. In some embodiments, a summary may be stored in a different location than the data structure(s) it describes, to facilitate quick, easy access thereto.

Figure 6:
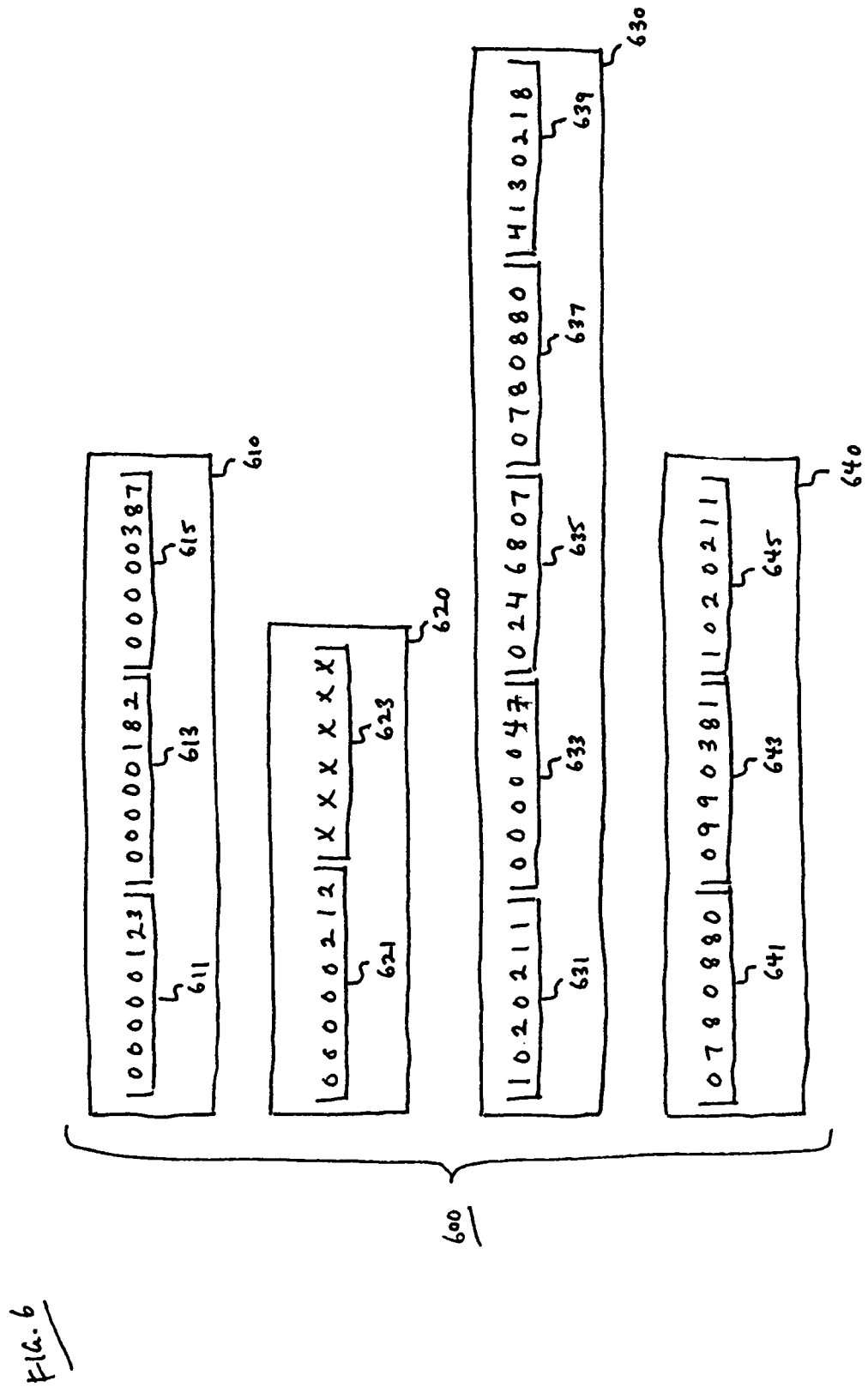
FIG. 6 is a representation of the format of an exemplary summary file according to some embodiments of the invention.

The format of an exemplary summary file 600 is shown in FIG. 6. Like the index file 500 depicted in FIG. 5, the summary file comprises four record types: header record 610, information record 620, type summary record 630 and file summary record 640. Also like the index file, a summary file may contain one or more of each of these record types, and the quantity of each record type may depend on the information stored in the data structure that the summary represents.

The header record 610 in the summary file has a format which is nearly identical to header record 510 (FIG. 5), and the information record 620 has a format which is nearly identical to the information record 520. Thus, header record 610 contains three portions, including information offset 611, type summary offset 613, and file summary offset 615, each of which indicates where other record types begin in the file.

Information record 620 contains two portions, including type quantity indicator 621, which provides the number of record types found in the summary record, and information string 623, which provides a configurable descriptor for the summary.

Type summary record 630 provides a value for the number of times that records of a type appear in the data structure, and the portion of the data structure in which records of that type appear. Type summary record 630 contains five portions, including record type indicator 631, message quantity indicator 633, transfer quantity indicator 635, first message index 637 and last message index 639. The indicators provided in type summary record 630 are very similar to the indicators provided in the type index record 530 (FIG. 5). Specifically, record type indicator 631 provides a classification for network events, message quantity indicator 633 provides a quantity of messages observed for this record type, transfer quantity indicator 635 provides an amount of data transferred during events corresponding to this record type, first message index 637 provides an offset at which the first record of this type can be found in the data structure represented by the summary, and last message index 639 provides an offset at which the last record of this type can be found in the data structure.

File summary record 640 provides an indication of one or more other data structures in which records of a particular type appear. File summary record 640 includes three portions, including record type indicator 645, data structure identifier 641, and next data structure indicator 643. Like the next message indicator provided in the index file of FIG. 5, the next data structure indicator 543 identifies the location of a following data structure which contains a record of this type. As such, the next data structure indicator provides a mechanism for directly accessing the next data structure containing a message of the type specified in the record type indicator 645, without requiring a search for a data structure containing a record of that type.

Upon the completion of act 330, the process may proceed to act 340, wherein information in the data structure may be compressed. Compression may be performed using any suitable means, such as with a software-based compression algorithm. Although many embodiments of process 300 may not include act 340, compression may serve several useful purposes, such as reducing the amount of storage space occupied by each data structure and expediting data access by allowing a computer to read more information in each disk cycle. If performed, compression may be accomplished using any suitable technique. In some embodiments, it may prove advantageous to employ a compression technique that produces output which can be read in compressed form. Accordingly, in some embodiments the Lempel-Z (i.e., Lempel-Ziv-Welch) compression algorithm is employed, although any of numerous algorithms may be employed.

If performed, the act 340 may also include the creation of a digital signature for the data structure, so that a modification to any records in the data structure may be detected. A digital signature may be prepared using any suitable technique, such as with a hash function (e.g., the MD5 hash function) of the information stored within the data structure.

If act 340 is not performed, upon the completion of act 330, the process proceeds to act 350. If act 340 is performed, the process proceeds to act 350 upon its completion as well. In act 350, the information collected and produced in the foregoing acts (i.e., the data structure, indices and summaries) is loaded to storage. In some embodiments, the data structures, indices and summaries created in the process of FIG. 3A are maintained as files (e.g., flat files) in a file system which resides on the site. However, the invention is not limited in this respect, as any suitable mechanism may be employed, and data may be stored in any suitable location.

One advantageous aspect of employing a file system is that certain data management functions (e.g., creating backups, archiving, etc.) may be easier than if an alternative method of data organization is employed, because many third-party utilities are configured to utilize the file system structure provided by various operating systems. If a file system is employed, any suitable file system may be used. For example, the Solaris, Windows and Unix operating systems provide file systems which may be used to store data collected and produced in the process of FIG. 3A.

Figure 7:
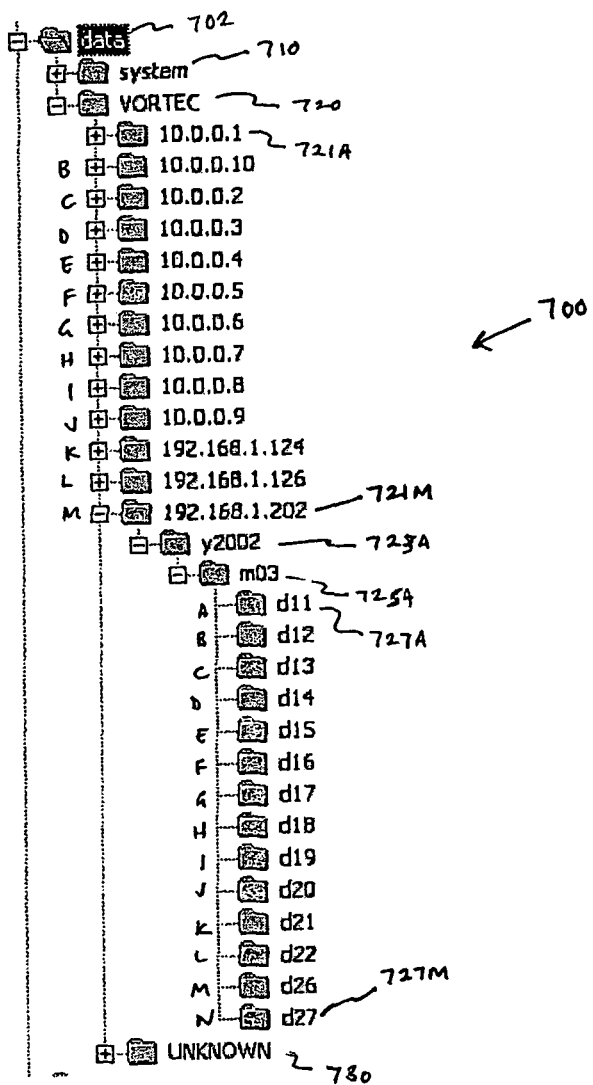
FIG. 7 is an illustration of an exemplary file system in which network activity data may be stored according to some embodiments of the invention.

In some embodiments, a file system such as that which is depicted in FIG. 7 may be employed. As with many file systems, the file system 700 of FIG. 7 stores data in directories or folders which are organized hierarchically. For example, "first-level" directory 702 ("data") includes "second-level" directories 710 ("system"), 720 ("VORTEC"), and 730 ("UNKNOWN"). Directory 710 stores data on specific system services events, and directory 730 stores data processed by devices with unrecognizable IP addresses. Neither of these directories contains information which is important to gaining an understanding of the invention.

Directory 720 contains several "third-level" directories, each of which store activity processed by devices under the purview of the site VORTEC. Specifically, directory 720 includes directories 721A-721M, each of which is identified by the IP address of the device that observed the activity stored therein. Any number of directories 721 may be provided to store information, as a site is not limited to a maximum number of devices. The devices designated to each directory may reside in a particular geographic area, monitor a particular protocol, share some other characteristic, or have no relation at all, as devices may be assigned to a site in any suitable manner.

Within each directory 721, any number of additional directories may be stored so that information is stored at a suitably granular level. In the example shown, directory 721 contains "fourth-level" directory 723A, which in turn contains "fifth-level" directory 725A, which in turn contains "sixth-level" directories 727A-727M. Directories may be organized in this manner to accomplish any storage objective. In the example shown, this scheme allows data to be stored in suitably small data structures (i.e., data structures which include data collected during sufficiently short time periods. Of course, data need not be organized in this manner, as any suitable organization scheme may be implemented.

Directory 721M contains directory 723A, which stores data collected for the device having IP address 192.168.1.202 in the year 2002 ("y2002"). Within directory 723A, directory 725A stores information for a specific month ("m03"). Within directory 725A, directories 727A-727N store information for specific days (e.g., "d11"). One or more data structures containing data collected during time periods within those days may be stored within directories 727. These data structures may contain data for any time period, such as for an hour, minute, second, or other interval. A data structure for a shorter time period may be stored either directly in the directory 727 corresponding to the appropriate day, or in a further subdirectory (not shown), such as one that stores data for a specific hour, minute, second, other interval, or combination thereof. Any suitable number of directory levels may be implemented, as the invention is not limited to a particular implementation.

In some embodiments, each data structure is stored with at least one index, and at least one summary, for the data structure. The index and/or summary may be stored in the same directory as the data structure, or may be stored in a different location or locations, such as a common storage location or locations for multiple indices and/or summaries. In some embodiments, by providing an index for the data in the file system, the system creates an object-oriented database which stores information specific to the site. That is, each data structure is an object that is catalogued by a database management system including the index(es).

Referring again to FIG. 3A, upon the completion of act 350, the process ends. It should be appreciated that the process of FIG. 3A is merely exemplary, and that aspects of the invention may be implemented using variations on the process described above. For example, a process in which only a subset of the acts described, or in which acts that are performed differently than in the manner described for an exemplified embodiment, may be executed to implement aspects of still other embodiments of the invention. For instance, a digital signature need not be created for each data structure in order for other aspects of the invention to be implemented. Similarly, compression is not a necessity.

Moreover, the acts described above may be performed in any suitable sequence. For example, the acts may be performed in a different order than that described, and/or some acts may be performed in parallel with one another.

III. Network-Based Data Collection and Analysis

Figure 8:
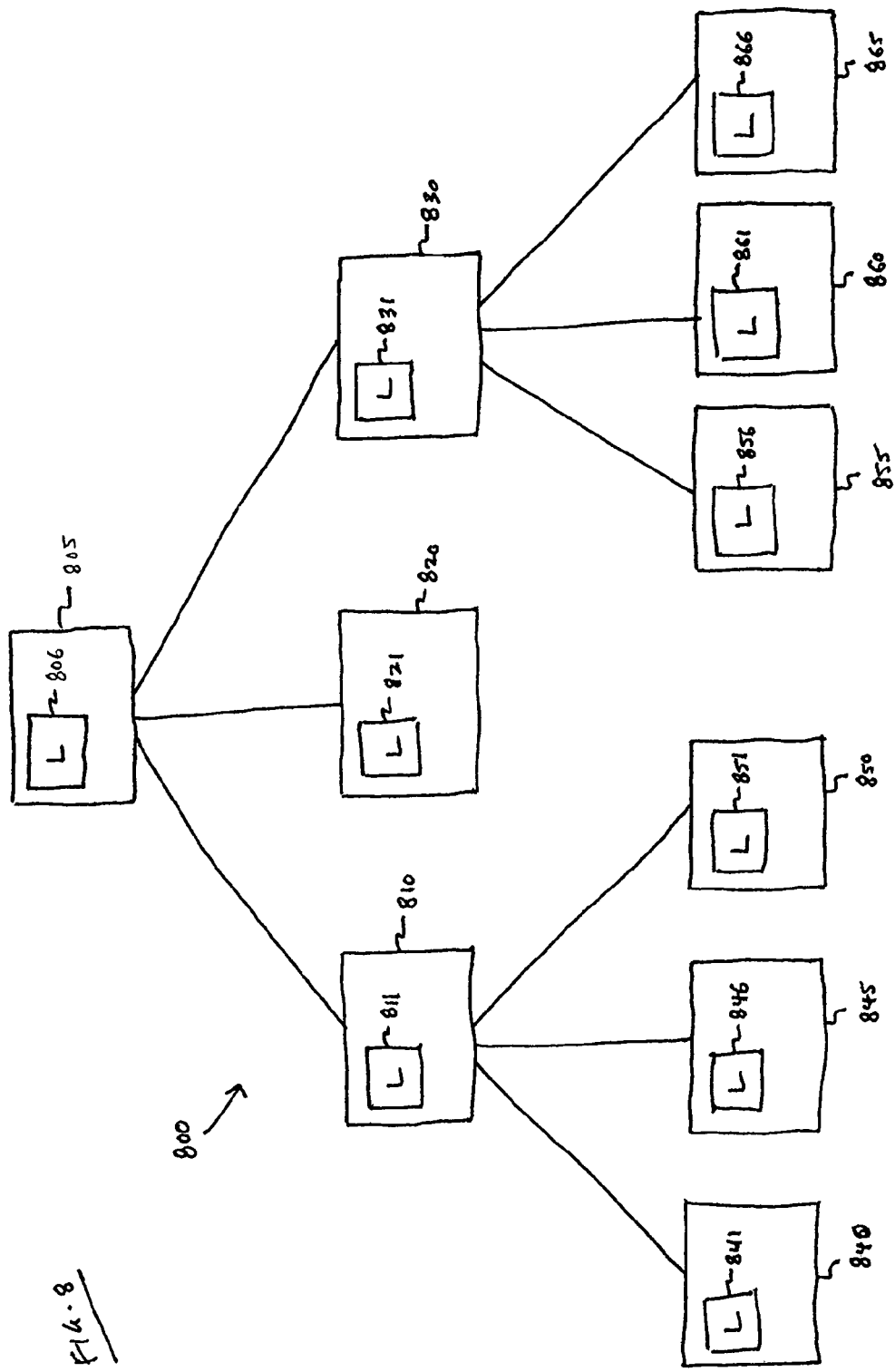
FIG. 8 is a block diagram of a group of sites in a network activity monitoring system, which may exchange data according to some embodiments of the invention.

As discussed above, according to aspects of the invention, a network activity monitoring system may comprise multiple sites, each of which may collect and store data for a portion (e.g., a geographic portion) of a network. FIG. 8 depicts exemplary system 800, which includes ten sites 805, 810, 820, 830, 840, 845, 850, 855, 860 and 865, which may be distributed (e.g., geographically distributed). According to some aspects of the invention, methods and apparatus are provided which facilitate the exchange of information between sites, such that analysis of activity occurring on any portion of the network (i.e., observed by devices on any site) may be initiated from any site.

Although the exemplary system 800 comprises ten sites, a system may comprise any number of sites. In some embodiments, sites may collectively form a peer-to-peer (P2P) database system, wherein any site can initiate a process implicating one or more other sites, such as a process wherein information is requested from one or more other sites. As is discussed in more detail below, this capability may be useful for accomplishing the transfer of information between sites. In some embodiments, the sites of FIG. 8 may be geographically dispersed, such that site 805, for example, may preside over a first portion of a network in one geographic area, site 810 may preside over a second portion in another geographic area, and so on. However, the invention is not limited to a particular implementation, or geographic dispersal.

For the purposes of transferring information therebetween, the sites of FIG. 8 are interrelated in a hierarchical organization scheme, such that sites are designated as subordinate sites, master sites or both. For example, sites 840, 845, 850 are designated as subordinate sites which are "assigned" to master site 810. Site 810 is also designated as a subordinate site assigned to master site 805 (along with sites 820 and 830). Any number of subordinate sites may be assigned to a master site.

In FIG. 8, each site depicted executes a "locator" service to perform the network activity monitoring functions described below. However, the functions described may be performed using any suitable means, including means which may not execute on individual sites. These means may be implemented in software, hardware, or a combination thereof. When implemented in software, any of the means may execute on any suitable processor or collection of processors, whether provided in a single computer or distributed among multiple computers. For example, a locator service may be implemented as a programmed routine or module (e.g., a daemon), which may execute on one or more computer systems that comprise a site.

In some embodiments, a "site map" is created for each site, which reflects information collected by devices under the purview of the site. In some embodiments, a site map is created and maintained by the locator service which executes on each site, although any suitable means may be employed. In some embodiments, a site map may be a file that includes various indications of data stored on a site. For example, in some embodiments, a site map may contain data such as a directory name on the site wherein observed network activity is stored (e.g., the "VORTEC" directory depicted in FIG. 7), a list of devices providing data stored in the directory, information on the types of devices deployed on the site, and the time periods during which the devices observed network activity. However, a site map may contain any suitable information. For example, a site map may contain various indications of data stored on a site, indications of data stored on multiple sites, and/or indications of the relationship(s) between sites.

Figure 9:
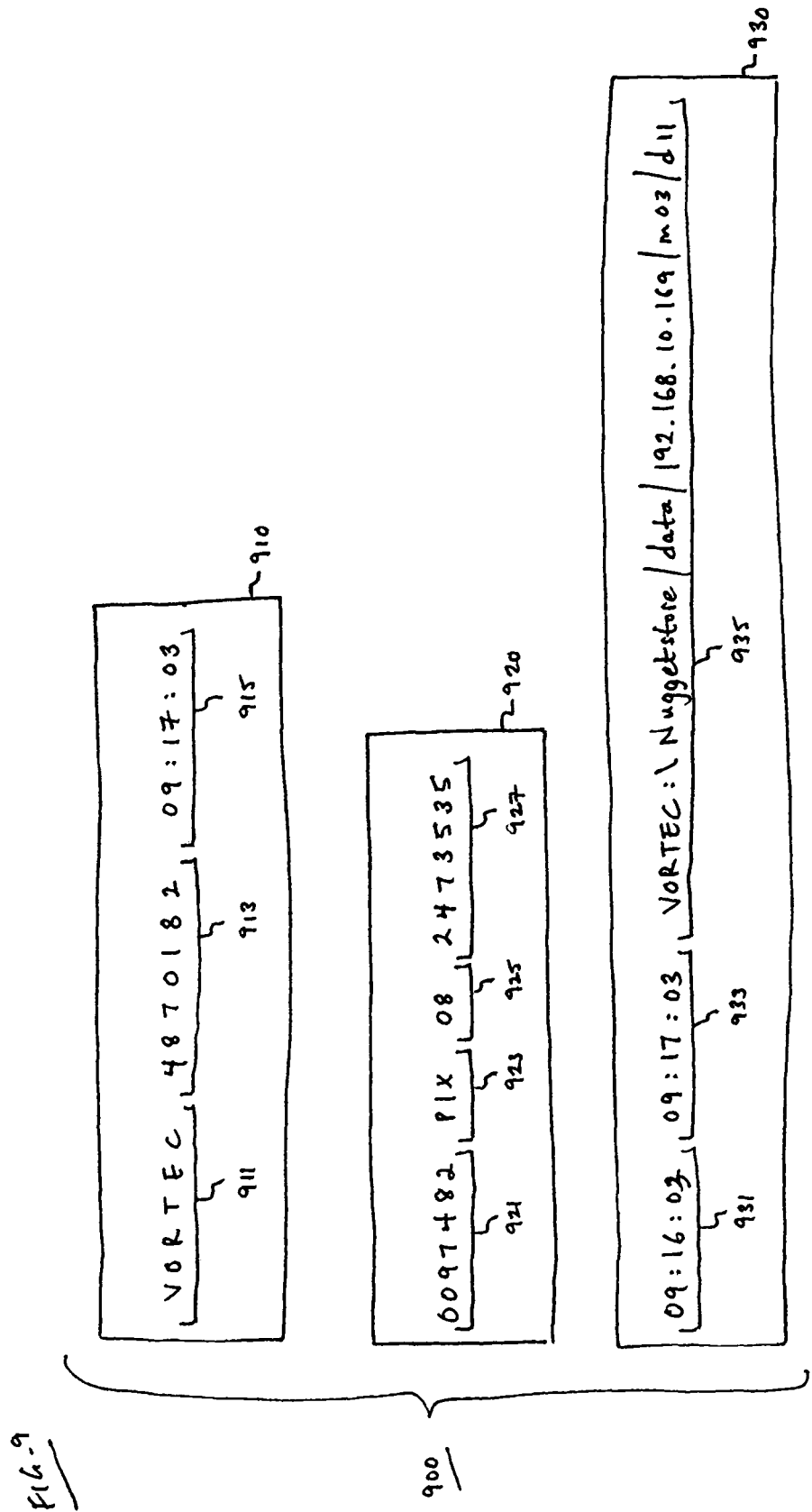
FIG. 9 is a representation of the format of a site map according to some embodiments of the invention.

A simplified version of an exemplary site map file is shown in FIG. 9. The site map file 900 contains three record types: site directory record 910, device directory record 920, and device time record 930. A site map file may contain one or more of each of these record types, but in general each file will contain a single site directory record 910, a number of device directory records 920 which corresponds to the number of devices under the purview of the site, and a number of device time records 930 that is a multiplier of the number of device directory records 920. However, any suitable type and number of records may be provided, as the invention is not limited to a particular implementation.

The site directory record 910 includes three portions which provide summary information for the site. Specifically, portion 911 provides the site name, portion 913 provides the total size of all event data (e.g., expressed in bytes, which may represent the number of bytes in compressed form), and portion 915 provides a time at which the event data within this site map file was last updated.

The device directory record 920 contains four portions which provide summary information for a device under the purview of the site. Specifically, portion 921 provides a device identifier (e.g., a unique numeric identifier), portion 913 provides a description of the device (e.g., a PIX firewall), portion 925 provides a device type (e.g., a numeric identifier), and portion 927 provides the total size of all event data reported by the device. Again, the size provided in portion 927 may be expressed in bytes, and may represent a number of bytes of event data in compressed form.

The device time record 930 contains three portions which provide an indication of the time period during which a device reported network events which are captured in a data structure (e.g., a data structure stored on a site in a file system like the file system 700 depicted in FIG. 7), and an indication of where data describing those events is stored (e.g., the location within the file system). Specifically, portion 931 provides a starting time for network events captured in a data structure, portion 933 provides an ending time for network events captured in the data structure, and portion 935 provides a location at which the data structure is stored on the site.

It should be appreciated that a site map provides an efficient and useful vehicle through which a site can inform other sites of the activity it has observed. In particular, while a site map contains a relatively small amount of data (thereby conserving the network bandwidth required to transmit it), it also provides enough information to inform other sites of the specific devices that have reported activity, the amount of activity each has reported, and the exact location on the network the activity can be found, if required.

A site map may be created and/or maintained in any of numerous ways. In some embodiments, a locator service scans a site's directories on a continuous basis, searching for new data to add to the site map. For example, as new files are created by the process of FIG. 3A and loaded to the file system depicted in FIG. 7, the locator service may update the site map accordingly. Thus, when a new device is added to the site, the locator process may automatically acknowledge the observations provided thereby, and incorporate the new device into the site map. However, site map creation and maintenance need not be performed continuously, and may be performed using any suitable means.

In some embodiments, if a site is designated as a master site for one or more subordinate sites (e.g., site 810, which is designated as a master site for subordinate sites 840, 845 and 850), the site may also store site maps for each of its subordinate sites. For example, the locator service executing on a site may coordinate the storage of subordinate site maps, although any suitable means may be employed. Also, in some embodiments, the site may receive site map information from its master site (e.g., site 810 may receive site map information from site 805). This function may also, for example, be performed by the locator service executing on a site, although any suitable means may be employed. This "upload" of site map information from one or more subordinates to a master site, and "download" of site map information from master to subordinate, may provide each site a catalog of some or all of the network activity data collected by each other site on the system.

Figure 10:
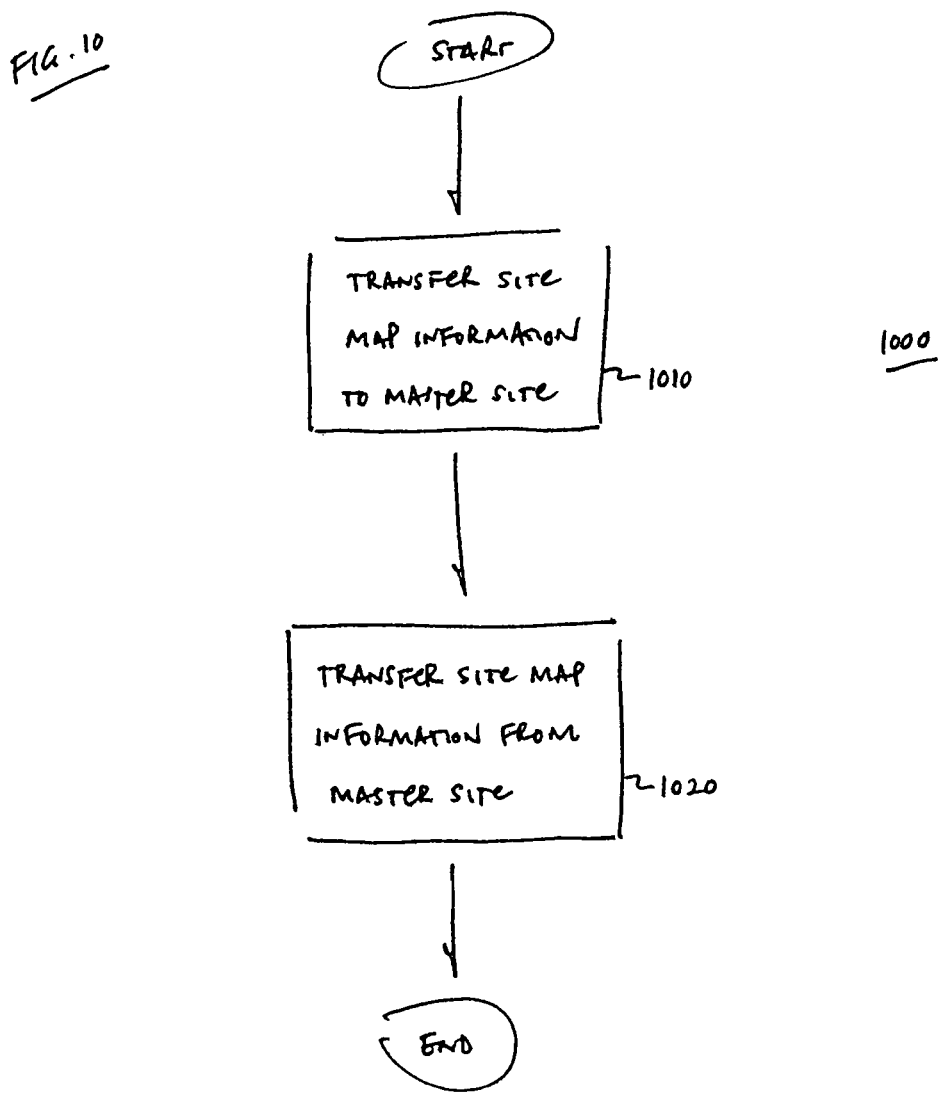
FIG. 10 is a flowchart depicting an exemplary process for exchanging site map information between sites according to some embodiments of the invention.

FIG. 10 depicts a process 1000, which may be performed by a locator service or any other suitable means, to facilitate the dissemination of site map information across a plurality of sites, so that each site is apprised of activity observed on all other sites. Upon the start of the process 1000 of FIG. 10, in act 1010, site map information is transferred (e.g., uploaded by a locator service) from a subordinate site to its master site (e.g., from locator process 841 executing on site 840 to site 810), where it may be received by a locator service executing on the master site. The physical transfer of data may be accomplished using any suitable means, as the invention is not limited in this respect. For example, in some embodiments, the locator process on the subordinate site may initiate a terminal session on the master site, and save the data in a predefined directory in a file system on the master site. Alternatively, data transfer may be accomplished using a mechanism such as one or more FTP (file transfer protocol) transmissions. Any suitable technique may be employed.

Further, in some embodiments, the transfer of data may be executed automatically (e.g., at predefined intervals), such as by a locator service which is programmed to do so. However, the invention is not limited to such an implementation, as the transfer need not occur automatically (e.g., the transfer process may be a semi-automated or manual process), and need not be predicated on the passage of time (e.g., it may be initiated by the recognition of the storage of a predefined volume of data on the site).

In embodiments wherein a system that includes hierarchically organized sites is provided, the transfer of site map information from a site to its master may include not only a site map for the site, but also site maps for subordinates which are assigned to the site. In one example, the locator process 811 (FIG. 8) may transfer site map information which includes not only the site map for site 810, but also the site maps for sites 840, 845 and 850. The invention is not limited to this implementation, as the transfer of site map information need not be performed by a locator service, and need not include site maps from all, or any, subordinate sites. For example, if site 850 is taken down for maintenance, or communication between sites 850 and 810 is somehow disrupted, the transfer of information in act 1010 may not include the site map for site 850. In this example, the transferred information may include site maps for sites 840 and 845, full or partial site maps for either of those sites, or no information for those sites at all. Any amount of information may be transferred in act 1010, as the invention is not limited to a particular implementation.

Upon the completion of act 1010, the process proceeds to act 1020, wherein site map information is transferred (e.g., downloaded) to the site from its master site. Similar to act 1010, this act may be initiated by any suitable means, such as a locator service which executes on the master site, and the information may be received, for example, by a locator service executing on the subordinate site. However, the invention is not limited to any particular implementation, as the transfer may be accomplished using any suitable means and/or technique, including a technique which is different from that used to transfer information to the master site in act 1010.

In some embodiments, just as information transferred by a site to its master may include site maps from the site's subordinates, information transferred from the master may include site maps from other sites that previously transferred them to the master site. For example, site 810 may receive a site map not only for its master site 805, but also site maps for sites 820 and 830. Moreover, because information sent to site 810 by site 830 may also include site maps from sites 855, 860 and/or 865, the information received by a site from its master may include site maps for all other sites on the system except the site's subordinates. Thus, the transfer process may ensure that each site receives a site map for each other site on the network.

In order to make the transfer process most effective, in some embodiments the timing of data transfer may be coordinated across sites, such that the transfer from subordinate to master sites occurs before the transfer from master to subordinate sites. For example, if data transfer between sites occurs periodically and site 840 is to be apprised of activity on site 865 as quickly as possible, site 830 should wait until data from site 865 (and possibly from sites 855 and 860) is transferred thereto before transferring data to site 800. Similarly, site 805 should wait for the upload from site 830 (and possibly from site 820) before transferring data to site 810. In the same way, site 810 should wait for the transfer from site 805 before transferring data to site 840. Thus, in order to ensure the quickest delivery of data between sites, in some embodiments site map transfers occur "up the chain" in sequence from the lowest-level subordinate to the highest-level master site, and then "down the chain" in sequence from the highest-level master to the lowest-level subordinate site(s). However, the invention is obviously not limited in this regard, as the transfer of information may occur in any suitable fashion.

Upon the completion of act 1020, the process completes. Because each site is provided with a catalog of activity observed on each other site, a user may perform analysis on activity occurring on any portion of the network from any site. Specifically, the catalog (i.e., site map) of data stored at each other site allows each site to apportion a user's queries into a portion that can be serviced by the site itself (i.e., using data stored locally on the site, such as in the file system of FIG. 7), and one or more additional portions which can be directed to other sites on which other requested data is stored. In some embodiments, sites may be configured to communicate additional query portions to the appropriate sites, receive responses from those sites, and aggregate the results for the user.

Figure 11:
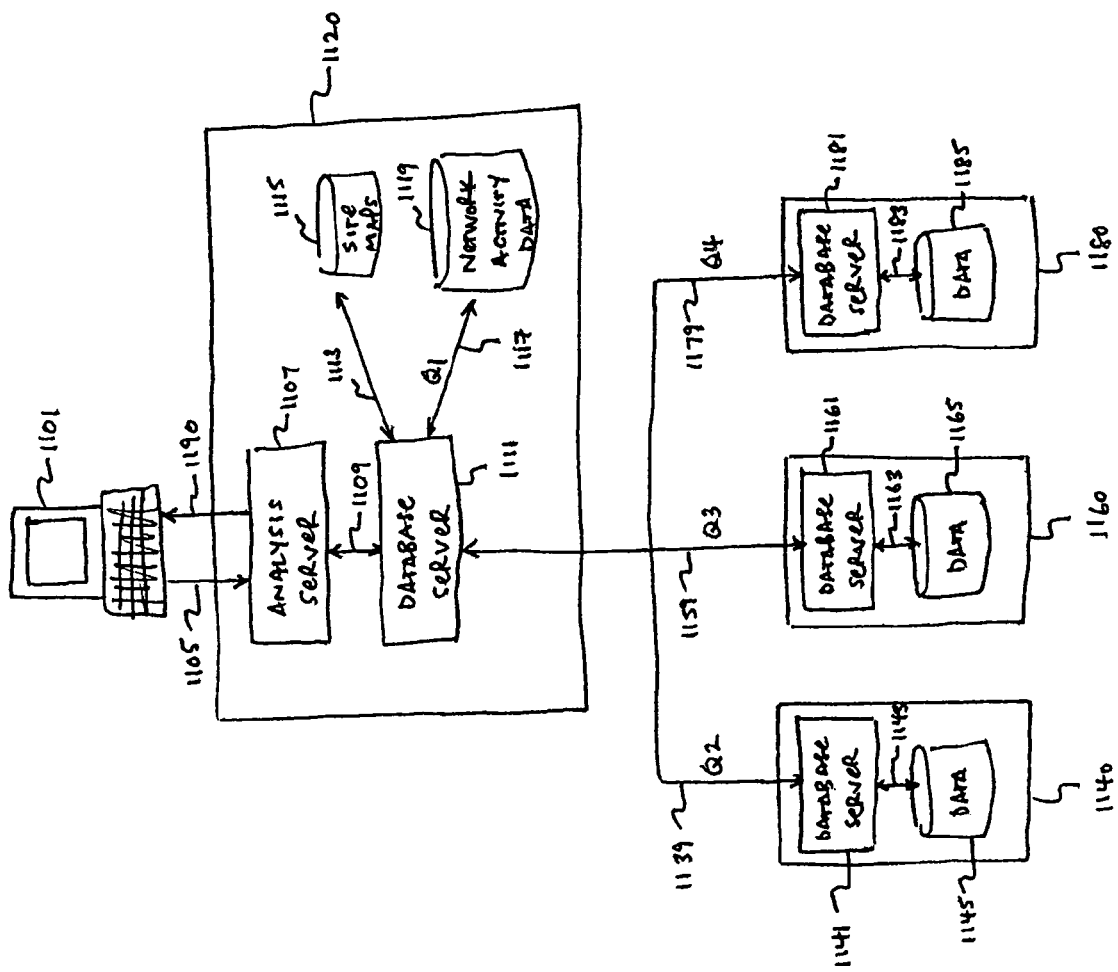
FIG. 11 is a block diagram of a system by means of which network activity data may be analyzed according to some embodiments of the invention.

A system with which a user may perform analysis on network activity observed by multiple sites according to some embodiments of the invention is depicted in FIG. 11. In FIG. 11, user console 1101 is in communication with site 1120. User console 1101 and site 1120 are configured such that a user may issue one or more queries (e.g., query 1105) to site 1120, and receive corresponding response(s) 1190. In the system depicted, site 1120 is also in communication with sites 1140, 1160 and 1180, and is configured to issue queries 1139, 1159 and 1179, respectively, and receive responses thereto.

A query issued from user console 1101 is received at site 1120 by analysis server 1107. In some embodiments, analysis server 1107 comprises a programmed interface specifically configured to service user queries issued over various communications media. However, the invention is not limited in this regard, as the analysis server may comprise a controller implemented in software, hardware, firmware, or a combination thereof. The analysis server may be configured to receive and service user requests which are transmitted over a LAN, the Internet, or locally (i.e., from a user console which is directly coupled to site 1120, unlike the embodiment shown). In some embodiments, the analysis server 1107 may be configured to provide multiple objects so that multiple user consoles may issue queries simultaneously without degrading performance of the analysis server or the site.

In the example shown, analysis server 1107 utilizes transmission link 1109 to send instructions (not shown) based on query 1105 to database server 1111. In some embodiments, a database server may comprises one or more programmed routines designed to process instructions by retrieving information from one or more data structures (e.g., an object-oriented database). However, the database server is not limited to such an implementation. Like the analysis server, a database server may be generically considered as a controller which may be implemented in hardware, software, firmware, or a combination thereof.

Upon receiving instructions from analysis server 1107, database server 1111 determines which sites store the information sought by query 1105 by accessing site maps 1115, which may have been updated using the process described with reference to FIG. 10 to comprise a catalog of data stored at each site. After determining on which sites the requested data resides, the database server may split the query 1105 into one or more partial queries, such that each partial query requests the data stored on the site to which it will be directed. In the example shown, the database server determines that the information sought is stored in four locations: locally (i.e., on site 1120), and on sites 1140, 1160 and 1180. As a result, the database server creates partial queries Q1, Q2, Q3 and Q4. Queries Q2, Q3 and Q4 are transmitted, via any suitable communications devices and/or protocols, to remote sites 1140, 1160, and 1180, respectively, for processing. More specifically, partial query Q2 is sent via transmission link 1139 to database server 1141 on site 1140, partial query Q3 is sent via transmission link 1159 to database server 1161 on site 1160, and partial query Q4 is sent via transmission link 1179 to database server 1181 on site 1180.

In addition to the partial queries which are issued to the remote sites, database server 1111 also creates partial query Q1 to be processed using network activity data 1119. Network activity data 1119 may be stored, for example, in a file system (e.g., the file system 700 depicted in FIG. 7). If the requested information is stored in the file system 700, the database server may access the requested information using one or more of the indices and/or summaries created using the process of FIG. 3A. However, the invention is not limited to any particular implementation, as any suitable data storage and/or access mechanism(s) may be employed.

Upon receipt of partial queries Q2, Q3 and Q4, database servers 1141, 1161 and 1181, respectively, retrieve the information requested from network activity data 1145, 1165 and 1185. Again, the requested information may be stored and retrieved on the remote sites using any suitable mechanisms. For example, each of the remote sites may maintain file systems analogous to the file system depicted in FIG. 7, and access information stored therein using indices and/or summaries similar to those which may be maintained on site 1120.

Upon the completion of each of queries Q2, Q3 and Q4, results are transmitted back by the respective sites to database server 1111, so that they may be combined with the results of query Q1 into a single result set. In some embodiments, upon receiving the results (e.g., observation records, or portions thereof), database server 1111 aggregates those results into a single result set by arranging the results in a predefined order. For example, in some embodiments, the results may be arranged chronologically, such that activity is ordered according to the time that it was observed. However, the invention is not limited in this regard, as the results from individual queries may be aggregated in any suitable manner. For example, results may be ordered by device, by site, or not at all (i.e., they may simply be concatenated).

Upon aggregating the results, database server 1111 may pass the results via analysis server 1107 to user console 1101 as transmission 1190. One or more applications executing on user console 1101 may process these results. For example, user console 1101 may execute an application which prepares and formats a report based on the results, loads the results to a spreadsheet, or otherwise processes the results. In some embodiments, analysis server 1107 may be configured to compress and/or encrypt the information comprising query response 1190.

Alternatively, upon aggregating the results, database server 1111 may load the results to a database (e.g., one or more relational database tables, not shown) residing on site 1120, such that user console 1101 may further manipulate or analyze the results in the database tables. For example, if a user decides that the volume of data encompassed by the results is too large to be stored on user console 1101, or if the user console 1101 possesses insufficient processing capacity, the user may opt to load the results to one or more database tables and access them using an application executing on user console 1101. A user may opt, as an example, to load a subset of the results (e.g., observation records containing a specific originating IP address) to the database tables and access them via a programming interface (e.g., an Open Database Connectivity (ODBC) connection).

Figure 12:
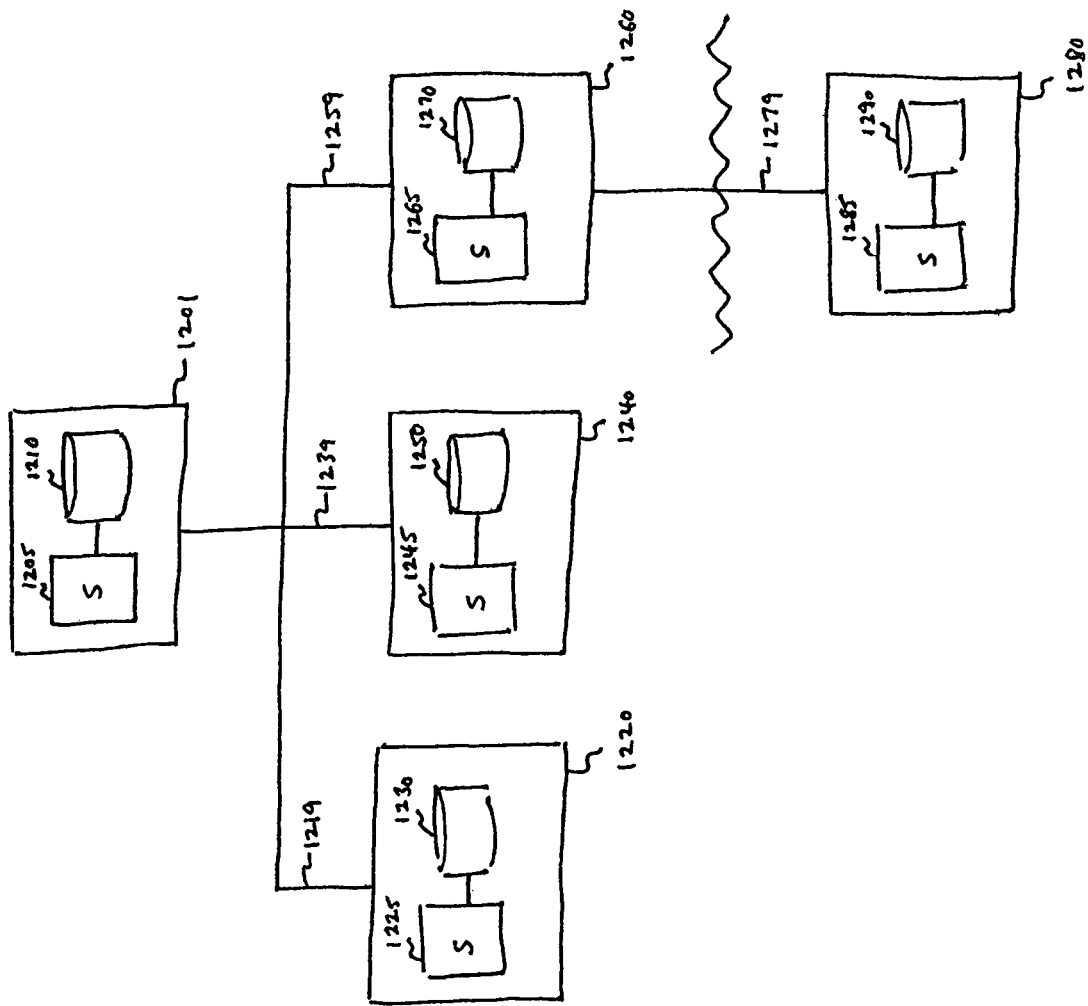
FIG. 12 is a block diagram of a system by means of which network activity data may be remotely collected and analyzed according to some embodiments of the invention.

According to some embodiments of the invention, sites may comprise nodes on a local area network (LAN), which may make the communication of query results (and other information) a relatively uncomplicated task. However, the invention is not limited in this regard, as sites need not be nodes on a LAN, and information transfer may be performed using any suitable communications device(s) and/or protocol(s). For example, one or more sites may be geographically separated from other sites in a system, and may transfer data related to observed network activity to another site using, for example, a wide area network (WAN) connection. An example of such a system configuration is shown in FIG. 12. According to some embodiments of the invention, methods and apparatus are provided which enable the analysis of network activity from any site regardless of the location of sites on the network.

In FIG. 12, a network activity monitoring system comprising five sites is depicted. Sites 1201, 1220, 1240 and 1260 may communicate via a LAN, and more specifically via communications links 1219, 1239 and 1259. Site 1280 is, for example, deployed in a different geographic region (e.g., on a separate continent) than the other sites, and communicates with site 1260 via connection 1279. Connection 1279 may comprise any suitable form of network connection, such as a dedicated connection.

Each site shown in FIG. 12 executes at least one service. For example, each site may execute a service that manages the collection and storage of data according to the process of FIG. 3A, a locator service that collects and transfers data according to the process 800 described with reference to FIG. 8, and/or another service. In addition, each site depicted includes a data storage facility, such as the file system 700 of FIG. 7. For example, site 1201 executes service 1201, and stores network activity data in storage facility 1210.

In some embodiments, in order to facilitate the analysis of network activity observed by all sites on the system, site 1260 serves as a "local collector" of activity observed by the "remote collector" site 1280. That is, in some embodiments, activity observed by the remote collector site 1280 is only stored in storage facility 1290 for a short period, whereupon it is transferred to local collector site 1260 for more permanent storage. In some embodiments, the interval at which the transfer occurs may be configurable.

In some embodiments, the transfer of data from site 1280 to site 1260 is performed by one or more programmed routines which execute on site 1280. These routines are discussed in detail below. However, it should be appreciated that the transfer of data may be performed using any suitable technique(s) and/or component(s). Such components may be generically considered as controllers, which may be implemented in software, hardware, firmware, or a combination thereof.

Before its transfer from site 1280, data may be compressed to decrease the network bandwidth required to perform the transfer, encrypted to address security concerns, or otherwise modified to accomplish other objectives.

Once data is transferred to site 1260, in some embodiments, its presence will be automatically acknowledged when a site map is created for site 1260. As a result, upon the transfer of site map information between the sites on the system (e.g., according to the process described with reference to FIG. 8), each site will be notified that network activity observed by site 1280 resides on site 1260. As such, analysis initiated from any site may incorporate the data collected by site 1280 using the process described with reference to FIG. 11.

Data from site 1280 may be stored on site 1260 in any suitable manner. For example, data may be stored in a file system similar to that which is depicted in FIG. 7, such that activity sent from site 1280 may be stored in a different subdirectory than the activity observed by site 1260. In addition, although FIG. 12 depicts only a single local collector, any number of sites may serve as local collectors. For example, any of sites 1201, 1220 or 1240 may also receive data from a remote collector. Moreover, a local collector may receive and store data for any number of remote collectors. For example, site 1260 might serve as a local collector for multiple remote collector sites (e.g., in addition to site 1280).

Further, a remote collector may itself serve as a collection point for activity observed by multiple other remote sites. For example, several other sites may provide observed activity to site 1280, which in turn passes it along to site 1260 for inclusion in analysis. The invention is not limited to being implemented in any particular manner.

In some embodiments, one or more programmed routines executing on a remote collector may be configured to immediately alert a corresponding local collector to the occurrence of predefined network activity. For example, one or more routines executing on site 1280 may be configured to immediately transfer observation records of a specific type to site 1260, such as those which may indicate a virus attack. In some embodiments, one or more routines may implement rules for processing activity as it is observed. These rules may, for example, include Boolean logic and/or account for relationships between events and the time at which they occurred. For example, one or more routines executing on site 1280 may transmit an alert message to site 1260 if an event of type X and an event of type Y are observed on site 1280 within ten seconds of each other, or if two events of type Z are observed within 24 hours of each other. This alert function may complement the transfer of a more complete set of data from a remote collector (e.g., site 1280) to a local collector (e.g., site 1260), or may be performed instead of a more complete transfer.

It should be appreciated that a remote collector need not be geographically removed from other sites in order to implement the techniques described above, as a site may be configured to communicate with only one other site for any of numerous reasons. For example, sites 1280 and 1260 may communicate via a virtual private network (VPN) for security. The techniques described above may be implemented regardless of the physical locations of the sites.

The above-described embodiments of the present invention may be implemented to allow a user to investigate activity occurring on any portion of a network by querying a single site on the network. For example, a system administrator may wish to determine all of the web sites that a particular user visited within the past week. To do so, the administrator may issue a query to a site, and more specifically to an analysis server, such as analysis server 1107 depicted in FIG. 11. Such a query may be issued using a graphical user interface (GUI) configured for this purpose, such as one which executes on terminal 1101.

The query may cause analysis server 1107 to issue instructions to a database server (e.g., database server 1111), to retrieve network activity data for the user's IP address. For example, the instructions may request information provided by certain observation records (e.g., record 400, shown in FIG. 4) whose payload portion contains the user's IP address.

To retrieve the requested information, the database server may access one or more site maps, such as the site maps 1115 shown in FIG. 11. As discussed above, the site maps 1115 may indicate which site(s) on the network have devices under their purview which have processed network events and transmitted notifications which satisfy the specified criterion. Specifically, the site maps may indicate the devices which transmitted at least one notification with a payload that contains the user's IP address. The site maps may indicate, for example, that six different sites store the desired information, including one site which is a local collector for multiple remote collectors. Therefore, the database server may construct six different partial queries, and transmit those partial queries to each of the six sites.

The partial queries may be received by corresponding database servers executing on each of the six sites, and each database server may process the partial query it receives.

Specifically, each database server may access network activity data stored on the site, such as data stored in a file system analogous to file system 700 (i.e., storing data in a similar fashion, but pertaining to different devices and/or activity). In order to locate the requested information, each database server may access one or more indices (e.g., index file 500 shown in FIG. 5) and/or summaries (e.g., summary file 600, shown in FIG. 6) stored in the file system. As discussed above, an index may indicate a location in the file system where requested information may be stored, while a summary may provide information to which satisfies the request without requiring that the file system be accessed. Thus, each database server may satisfy a partial query using information provided by one or more summaries, indices (i.e., specifying one or more locations in a data structure where requested information is stored), both, or neither (as information stored in a data structure such as file system 700 need not be accessed using an index). In this example, because the administrator wishes to identify the web sites visited by the user within the prior week, in some embodiments, each database server may simply retrieve a destination IP address from the payload of each observation record that identifies the user's IP address as an originating IP address. Alternatively, each database server may retrieve an entire record each time the payload portion includes the user's IP address.

In this example, one of the sites is a local collector (e.g., site 1260, shown in FIG. 12) for multiple remote collectors (e.g., a plurality of sites like site 1280, also shown in FIG. 12). Thus, the local collector may store network activity data provided by each of its remote collectors. As a result, if any of the remote collectors store information for a device that has processed a network event involving the user's IP address, the database server on the local collector (e.g., site 1260) may include the event(s) in its response to the partial query transmitted to database server 1111.

The information retrieved by each database server may be included in a partial query response which is transmitted to the database server 1111. Upon receiving the partial query responses from each of the sites, database server 1111 may aggregate them. As discussed above, this may include placing information contained therein in order (e.g., in an order defined by the time at which notifications containing requested information were transmitted). The database server 1111 may then provide aggregated information to analysis server 1107, so that the information may be presented immediately to the administrator via the GUI, or the database server 1111 may load the aggregated information to one or more data structures (e.g., relational database tables) so that the information may be scrutinized more closely.

It can be seen that aspects of the present invention enable a user (e.g., the administrator in the example above) to analyze network events reported by any number of devices on a network, regardless of the devices' geographic location. Data indicative of those network events may be stored on one or more distributed sites on the network. Each site may store the data in a file system, and may provide indexes and/or summaries for the data, thereby facilitating quick and easy access thereto. Thus, some aspects of the present invention may eliminate the storage overhead and data inaccessibility issues which plague conventional systems.

Various aspects of the present invention, and the exemplary embodiments thereof, may be implemented in any suitable manner. For example, any subset of the above-described features may be implemented in combination, as the invention is not limited to being wholly implemented.

It should be appreciated that one implementation of embodiments of the present invention comprises at least one computer-readable medium (e.g., a semiconductor memory and/or a magnetic medium such as floppy disk, compact disc, tape, etc.) encoded with one or more computer programs (i.e., each including a plurality of instructions), which, when executed on a processor or processors, performs some or all of the functions described above of the illustrative embodiments of the present invention. The computer-readable medium can be transportable such that the programs stored thereon can be loaded onto any computer system resource to implement the aspects of the present invention described herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein the above-described processes are at least partially implemented with a computer, these processes may, during the course of their execution, receive input manually (e.g., from a user), in the manners described above. In addition, processes may receive input from electronic processes, which may be provided without the active involvement of a human operator.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method, comprising:
    collecting and storing a plurality of transmission events comprised within a packet payload reported by one or more nodes of a network, into one or more data structures by,
        ascertaining one or more characteristics of each of one or selected said plurality of transmission events, and
        creating said one or more data structures based on each of said one or more characteristics,
        wherein each of said one or more data structures comprises one or more observation records generated from one or more of said plurality of transmission events and stored based on said one or more characteristics;
    extracting one or more data elements and at least one data feature comprising content of a message from each of said plurality of transmission events stored in said one or more data structures;
    creating one or more indices based on said stored data element, for each or for selected said one or more data structures,
        wherein at least one of said one or more indices comprises at least one indicator of a location of said one or more data elements; and
    creating one or more summaries for said each or of said selected data structures of said one or more data structures,
        wherein at least one of said one or more summaries comprises one or more data features of said one or more transmission events for determining the presences of at least one or more data features in any of said one or more transmission events or in selected said one or more transmission events.

2. The method of claim 1, wherein, a response to a received query of one or more of said plurality of transmission events is formed from one or more of said one or more summaries absent a use of said one or more indices.

3. The method of claim 1, wherein said one or more indices or said one or more summaries are created using or summarizing at least one of said one or more characteristics comprised in said one or more observation records.

4. The method of claim 1, wherein storing said one or more observation records indicates the presence of at least one of said one or more characteristics in said one or selected of said one or more data structures.

5. The method of claim 1, wherein said one or more transmission events of said plurality of the transmission events are collected during one or more predetermined periods of time.

6. The method of claim 1, wherein at least one of said one or more observation records, generated using said one or more transmission events of said plurality of the transmission events, comprises one of said one or more transmission events in a complete unabridged form.

7. The method of claim 1, wherein at least one of said one or more data features comprise a number of occurrences of a destination internet protocol address for at least one of said content of a message of said transmission events in at least one of said one or more data structures.

8. The method of claim 1, wherein said one or more data elements are stored within at least one of said one or more data structures.

9. The method of claim 1, wherein each of said one or more indices comprises one or more of:
a type of or an importance level for a transmission event of said plurality of the transmission events,
an internet protocol address of a node of said one or more nodes having reported said transmission event, and
an internet protocol address of a node of said one or more nodes indicating a destination of said transmission event.

10. The method of claim 1, wherein said one or more data elements comprise partial or complete data comprised of said content of a message in at least one of the one or more transmission events.

11. The method of claim 1, wherein all or selected transmission events of said plurality of the transmission events are notifications provided by all or selected nodes of said one or more nodes of said network.

12. The method of claim 1, further comprising one or two of:
performing compression of said at least one data structure of said one or more data structures,
and creating a digital signature of said at least one data structure of said one or more data structures.

13. An apparatus, comprising:
a first controller processor, configured to collect and store a plurality of transmission events comprised within a packet payload reported by one or more nodes of a network, into one or more data structures, said first controller processor
ascertaining one or more characteristics of each of one or selected said plurality of transmission events, and
creating said one or more data structures based on each of said one or more characteristics,
wherein each of said one or more data structures comprises one or more observation records generated from one or more of said plurality of transmission events and stored based on said one or more characteristics;
a second controller processor, configured to extract one or more data elements and at least one data feature comprising content of a message from each of said plurality of transmission events stored in said one or more data structures;
a third controller processor, configured to create one or more indices based on said stored data element, for each or for selected said one or more data structures,
wherein at least one of said one or more indices comprises at least one indicator of a location of said one or more data elements, and
further configured to create one or more summaries for said each of the one or selected of said one or more data structures,
wherein at least one of said one or more summaries comprises one or more data features of said one or more transmission events for determining the presences of at least one or more data features in any of said one or selected of said one or more transmission events; and
a memory, configured to store said one or more indices and said one or more summaries.

14. The apparatus of claim 13, wherein said memory is further configured to store said one or more stored data structures.

15. The apparatus of claim 13, wherein, a response to a received query about one or more of said plurality of transmission events is formed absent a use of said one or more indices.

16. The apparatus of claim 13, wherein said one or more indices or said one or more summaries are created using or summarizing at least one of said one or more characteristics comprised in said one or more observation records.

17. The apparatus of claim 13, wherein storing said one or more observation records indicates the presence of at least one of said one or more characteristics in said one or selected of said one or more data structures.

18. The apparatus of claim 13, wherein said one or more transmission events of said plurality of the transmission events are collected during one or more predetermined periods of time.

19. The apparatus of claim 13, wherein at least one of said one or more observation records, created using one or more transmission events of said plurality of the transmission events, comprises one of said one or more transmission events in a complete-unabridged form.

20. A non-transitory computer-usable medium, comprising computer readable instructions stored thereon for execution by a processor to perform a method comprising:
collecting and storing a plurality of transmission events comprised within a packet payload reported by one or more nodes of a network, into one or more data structures by,
ascertaining one or more characteristics of each of one or selected said plurality of transmission events, and
creating said one or more data structures based on each of said one or more characteristics,
wherein each of said one or more data structures comprises one or more observation records generated from one or more of said plurality of transmission events and stored based on said one or more characteristics;
extracting one or more data elements and at least one data feature comprising content of a message from each of said plurality of transmission events stored in said one or more data structures;

creating one or more indices based on said stored data element, for said each of the one or selected of said one or more data structures, wherein at least one of said one or more indices comprises at least one indicator of a location of said one or more data elements; and creating one or more summaries for said each of the one or selected data structures of said one or more data structures, wherein at least one of said one or more summaries comprises one or more data features of said one or more transmission events for determining the presences of at least one or more data features in any of said one or more transmission events or in selected said one or more transmission events.

\* \* \* \* \*